US012299050B2

(12) United States Patent
Zhong et al.

(10) Patent No.: US 12,299,050 B2
(45) Date of Patent: May 13, 2025

(54) MULTI-MODEL, MULTI-TASK TRAINED NEURAL NETWORK FOR ANALYZING UNSTRUCTURED AND SEMI-STRUCTURED ELECTRONIC DOCUMENTS

(71) Applicant: International Business Machines Corporation, Armonk, NY (US)

(72) Inventors: Peter Zhong, Vermont (AU); Antonio Jose Jimeno Yepes, Melbourne (AU); Elaheh ShafieiBavani, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 16/815,391

(22) Filed: Mar. 11, 2020

(65) Prior Publication Data
US 2021/0286989 A1 Sep. 16, 2021

(51) Int. Cl.
*G06F 16/93* (2019.01)
*G06F 40/205* (2020.01)
(Continued)

(52) U.S. Cl.
CPC ............ *G06F 16/93* (2019.01); *G06F 40/205* (2020.01); *G06N 3/044* (2023.01); *G06N 3/045* (2023.01);
(Continued)

(58) Field of Classification Search
CPC .......... G06F 16/35; G06F 16/39; G06F 40/30; G06F 40/35; G06F 40/103; G06F 40/177;
(Continued)

(56) References Cited

U.S. PATENT DOCUMENTS 7,587,420 B2    9/2009  Kobayashi et al.
7,873,624 B2    1/2011  Agichtein et al.
(Continued)

FOREIGN PATENT DOCUMENTS

CN           105574133 A        5/2016

OTHER PUBLICATIONS

Kumar, A. et al., "Ask Me Anything: Dynamic Memory Networks for Natural Language Processing" (Year: 2016).*
(Continued)

*Primary Examiner* — Alexey Shmatov
*Assistant Examiner* — Devika S Maharaj
(74) *Attorney, Agent, or Firm* — CANTOR COLBURN LLP; Jared Chaney

(57) ABSTRACT

Embodiments of the invention describe a computer-implemented method of analyzing an electronic version of a document. The computer-implemented method can include an architecture of machine learning sub-models that performs the global task of translating unstructured and semi-structured inputs into numerical representations that can be recognized and manipulated by a content-analysis (CA) sub-model without relying on brute force analysis. Embodiments of the invention achieve these results by separating the global task into auxiliary tasks and assigning each sub-model to at least one of the auxiliary tasks. The auxiliary tasks can include parsing the unstructured or semi-structured inputs into format types (e.g., lists, tables, figures, text, etc. of a PDF document), extracting features of the parsed document, and performing a computer-based CA on the extracted features. The sub-models are trained in stages and in groups, wherein both the stages and the groupings are based on the complexity of the sub-model's assigned task.

23 Claims, 11 Drawing Sheets

(51) Int. Cl.
*G06N 3/044* (2023.01)
*G06N 3/045* (2023.01)
*G06N 3/08* (2023.01)
*G06N 3/084* (2023.01)
*G06N 5/025* (2023.01)
*G06N 5/04* (2023.01)
*G06N 20/00* (2019.01)
*G06N 20/20* (2019.01)
*G06V 10/82* (2022.01)
*G06V 30/10* (2022.01)
*G06V 30/19* (2022.01)
*G06V 30/413* (2022.01)

(52) U.S. Cl.
CPC ............... *G06N 3/08* (2013.01); *G06N 3/084* (2013.01); *G06N 5/025* (2013.01); *G06N 20/20* (2019.01); *G06V 10/82* (2022.01); *G06V 30/19173* (2022.01); *G06V 30/413* (2022.01); *G06N 5/04* (2013.01); *G06N 20/00* (2019.01); *G06V 30/10* (2022.01)

(58) Field of Classification Search
CPC ... G06F 40/205; G06F 40/216; G06N 3/0445; G06N 3/0454; G06N 3/08; G06N 3/084; G06N 5/025; G06N 5/04; G06N 20/00; G06N 20/20; G06V 10/82; G06V 30/10; G06V 30/19173; G06V 30/413
See application file for complete search history.

(56) References Cited

U.S. PATENT DOCUMENTS

| | | |
|---|---|---|
| 8,768,925 B2 | 7/2014 | Brown et al. |
| 2004/0049499 A1 | 3/2004 | Nomoto et al. |
| 2015/0074112 A1 | 3/2015 | Liu et al. |
| 2016/0179934 A1 | 6/2016 | Stubley et al. |
| 2017/0277663 A1 | 9/2017 | Reimherr et al. |
| 2017/0371955 A1 | 12/2017 | Allen et al. |
| 2018/0121551 A1* | 5/2018 | Krasadakis ........... G06F 16/958 |
| 2019/0147010 A1 | 5/2019 | Musuluri |
| 2019/0171944 A1* | 6/2019 | Lu .......................... G06N 20/00 |
| 2019/0325308 A1* | 10/2019 | Chung ..................... G06N 3/08 |
| 2020/0302016 A1* | 9/2020 | Aggarwal ............ G06V 30/414 |
| 2021/0012103 A1* | 1/2021 | Bassu ..................... G06F 16/84 |
| 2021/0019339 A1* | 1/2021 | Ghulati .................. G06Q 50/00 |
| 2021/0027098 A1* | 1/2021 | Ge ........................ G06F 18/217 |

OTHER PUBLICATIONS

De Cao et al., "Question Answering by Reasoning Across Documents with Graph Convolutional Networks." arXiv preprint arXiv:1808.09920 (2018), 13 pages.

Zhong et al., "Coarse-grain fine-grain coattention network for multi-evidence question answering," arXiv preprint arXiv:1901.00603 (2019), 27 pages.

* cited by examiner

Multi-stage, Multi-task Training 610

Stage 1: pre-train document layout model 510 with PubLayNet ($l_{lay}$)

Stage 2.1: pre-train text OCR model 520 with (text image, text) pairs ($l_{ocr}$)

Stage 2.2: pre-train table understanding model 522 with (table image, html) pairs ($l_{tab}$)

Stage 2.3: pre-train figure understanding model 524 with (figure image, caption) pairs ($l_{fig}$)

Stage 2.4: pre-train list understanding model 526 with (list image, html) pairs ($l_{list}$)

Stage 3: jointly train the auxiliary task sub-models 438A with weighted sum of loss ($l_{lay} + \alpha l_{ocr} + \beta l_{tab} + \gamma l_{fig} + \delta l_{list}$)

Stage 4: jointly train the multi-task trained sub-models 436A (including QA model 440A) with weighted sum of loss ($l_{lay} + \alpha l_{ocr} + \beta l_{tab} + \gamma l_{fig} + \delta l_{list} + \varepsilon l_{qa}$)

FIG. 6B

MULTI-MODEL, MULTI-TASK TRAINED NEURAL NETWORK FOR ANALYZING UNSTRUCTURED AND SEMI-STRUCTURED ELECTRONIC DOCUMENTS

BACKGROUND

The present invention relates generally to programmable computer systems. More specifically, the present invention relates to programmable computer systems that implement a novel multi-model, multi-task trained neural network for analyzing unstructured and/or semi-structured electronic documents having different format types (e.g., figures, tables, lists, text, and the like) contained therein.

Natural language processing (NLP) is a field of computer science that uses algorithms and computer systems to process human languages such as English. Human language is often referred to as natural language. In general, the terms "natural language" refer to language that has been developed by humans over time as a method of communicating between people, rather than language that has been created for communication between non-human entities such as computers.

NLP is used in systems that allow humans to more effectively interface with data repositories that store electronic information, including, for example, electronic versions of human readable electronic documents. NLP interfaces/systems have been developed to perform a variety of human/data interface tasks such as text-searching and/or text-matching, as well as more sophisticated tasks such as document/data content analysis (DCA). In general, DCA systems conduct computer-assisted research and analysis using the categorization and classification of speech, written text, interviews, images, or other forms of electronically stored sources of information. A known type of DCA is so-called a "question and answer (QA) system" that use NLP and machine learning algorithms to cognitively analyze a variety of stored sources of information in order to provide answers to open-ended natural language questions.

In known implementations of DCA and/or QA systems, training data is used to train machine learning models (or classifiers) to perform the systems' overall task(s). This training stage requires that training data, as well as post-training real world data-under-analysis, is translated into numerical representations that can be recognized and manipulated by the DCA system's machine learning model. Examples of suitable numerical representations of the data include tokens, vectors, and the like. Translating training data and/or post-training real world data-under-analysis into such numerical representations can be a processing bottleneck in known DCA/QA systems. This is particularly true when the training data and/or post-training real world data-under-analysis are unstructured and/or semi-structured.

Electronic information can be categorized as unstructured, semi-structured, or structured. Unstructured electronic information is not organized in a uniform format (i.e., it is not labeled or otherwise organized) and can include text, images, video, and audio material. Similarly, semi-structured electronic information includes some form of organization (e.g., some semantic labels/tags) but the chosen organization method lacks consistency, is not standardized, or has some other deficiency. In contrast, structured electronic information is information that has been well-organized and arranged in a systematic, easily accessible way, including, for example, attaching consistent labels to the electronic information and/or organizing the electronic information into an addressable repository or a database.

Because virtually all of the electronic information generated in the day-to-day functions of businesses, academic institutions, non-business enterprises, and individuals is unstructured and/or semi-structured, a large amount of unstructured and/or semi-structured electronic information represents a large amount of information that is substantially unavailable as an information source to known DCA systems. In general, the results generated by DCA systems can be improved with access to a wider range and variety of electronic information. Accordingly, it would be beneficial to provide DCA systems that can electronically read and understand the vast amounts of unstructured and/or semi-structured electronic information efficiently, reliably, and without requiring large amounts of computing resources.

SUMMARY

Embodiments of the invention describe a computer-implemented method of analyzing an electronic version of a document. The computer-implemented method includes receiving, using a processor, an electronic document that includes electronic document data configured to include multiple electronic format types within each document. A document layout machine learning model is used to parse the electronic document data into its multiple electronic format types, wherein the multiple electronic format types include at least a first electronic format type and a second electronic format type. A first machine learning model receives the electronic document data in the first electronic format type, wherein the first machine learning model is configured to label the electronic data in the first electronic format type. A second machine learning model receives the electronic document data in the second electronic format type, wherein the second machine learning model is configured to label the electronic data in the second electronic format type.

Embodiments of the invention are further directed to computer systems and computer program products having substantially the same features as the above-described computer-implemented method.

Embodiments of the invention are directed to a computer-implemented method of performing a global task that includes analyzing an electronic version of a document. The computer-implemented method includes receiving, using a processor, an electronic document that includes electronic document data having multiple electronic format types. A first machine learning model is used to perform a first sub-task of the global task, wherein the first sub-task includes parsing the electronic document data into the multiple electronic format types, thereby generating multiple parsed electronic format types. Each of the multiple parsed electronic format types is individually labeled, thereby generating multiple parsed labeled electronic format types that include a first parsed labeled electronic format type and a second parsed labeled electronic format type. A first format-type machine learning model is used to perform a second sub-task of the global task, wherein the second sub-task includes extracting features from the first parsed electronic format type, thereby generating a first set of extracted features. A second format-type machine learning model is used to perform a third sub-task of the global task, wherein the third sub-task includes extracting features from the second parsed electronic format type, thereby generating a second set of extracted features. A content analysis (CA) machine learning model is used to perform a fourth sub-task of the global task, wherein the fourth sub-task includes receiving an inquiry; analyzing the first set of extracted features to determine a relevance of the first parsed labeled electronic format type to the inquiry; and analyzing the second set of extracted feature to determine a relevance of the second parsed labeled electronic format type to the inquiry. The first machine learning model, the first format-type machine learning model, the second format-type machine learning model, and the CA machine learning model have been trained in stages that include a set of individual training stages, a first joint training stage, and a second joint training stage. The set of individual training stages includes training the first machine learning model individually to perform the first sub-task; training the first format-type machine learning model individually to perform the second sub-task; training the second format-type machine learning model individually to perform the third sub-task; and training the CA machine learning model individually to perform the fourth sub-task. The first joint training stage includes jointly training the first machine learning model to perform the first sub-task; the first format-type machine learning model to perform the second sub-task; and the second format-type machine learning model to perform the third sub-task. The second joint training stage includes jointly training the first machine learning model to perform the first sub-task; the first format-type machine learning model to perform the second sub-task; the second format-type machine learning model to perform the third sub-task; and the CA machine learning model to perform the fourth sub-task.

In some of the above-described embodiments, the electronic document received using the processor can be unlabeled; the electronic document data can include electronic image data; the first electronic format type can be selected from a group consisting of a segment of text, a table, a figure, and a list; and the second electronic format type can be selected from the group consisting of a segment of text, a table, a figure, and a list.

In some of the above-described embodiments, the fourth sub-task performed by the CA machine learning model can further include generating a response to the inquiry based at least in part on the relevance of the first parsed labeled electronic format type to the inquiry; and the relevance of the second parsed labeled electronic format type to the inquiry the analysis.

Embodiments of the invention are further directed to computer systems and computer program products having substantially the same features as the above-described computer-implemented method.

Embodiments of the invention are directed to a computer-implemented method of training a CA network to perform a global task, wherein the global task includes analyzing an electronic version of a document. The computer-implemented method includes receiving auxiliary tasks, wherein each of the auxiliary tasks is a component of the global task and has an assigned task complexity level. A task-specific sub-model is assigned to or associated with each of the auxiliary tasks such that each of the task-specific sub-models has an assigned/associated one of the auxiliary tasks and an assigned/associated one of the task complexity levels. Each of the task-specific sub-models is individually trained to perform its assigned/associated one of the auxiliary tasks. A first group of the task-specific sub-models is identified based at least in part on the assigned/associated ones of the complexity levels of the assigned/associated ones of the tasks performed by the task-specific sub-models in the first group. A second group of the task-specific sub-models is identified based at least in part on the assigned/associated ones of the complexity levels of the assigned/associated ones of the tasks performed by the task-specific sub-models in the second group. The first group of the task-specific sub-models are jointly trained to perform their assigned/associated ones of the auxiliary tasks. The first group of the task specific sub-models and the second group of the task-specific sub-models are jointly trained to perform their assigned/associated ones of the auxiliary tasks. The highest assigned/associated one of the complexity levels of the assigned/associated ones of the tasks performed by the task-specific sub-models in the first group is less than the lowest assigned/associated one of the complexity levels of the assigned/associated one of the tasks performed by the task-specific sub-models in the second group.

In some of the above-described embodiments of the invention, the second group can include one or more of the task-specific sub-models.

Embodiments of the invention are further directed to computer systems and computer program products having substantially the same features as the above-described computer-implemented method.

Embodiments of the invention are directed to a method of forming a computer system, wherein the computer system is configured to perform a global task that includes analyzing an electronic version of a document. The method includes providing a memory and a processor communicatively coupled to the memory, wherein the processor is configured to perform operations that include receiving an electronic document that includes electronic document data having multiple electronic format types. A first machine learning model is used to perform a first sub-task of the global task, wherein the first sub-task can include a first assigned or associated complexity level. The first sub-task can include parsing the electronic document data into the multiple electronic format types, thereby generating multiple parsed electronic format types; and individually labeling each of the multiple parsed electronic format types, thereby generating multiple parsed labeled electronic format types that include a first parsed labeled electronic format type and a second parsed labeled electronic format type. A first format-type machine learning model is used to perform a second sub-task of the global task, wherein the second sub-task can include a second assigned/associated complexity level and can further include extracting features from the first parsed electronic format type, thereby generating a first set of extracted features. A second format-type machine learning model is used to perform a third sub-task of the global task, wherein the third sub-task can include a third assigned/associated complexity level and can further include extracting features from the second parsed electronic format type, thereby generating a second set of extracted features. A CA machine learning model is used to perform a fourth sub-task of the global task, wherein the fourth sub-task can include a fourth complexity level and can further include receiving an inquiry; analyzing the first set of extracted features to determine a relevance of the first parsed labeled electronic format type to the inquiry; and analyzing the second set of extracted feature to determine a relevance of the second parsed labeled electronic format type to the inquiry. The fourth complexity level is greater than the third complexity level alone; the second complexity level alone; and the first complexity level alone.

In some of the above-described embodiments of the invention, the electronic document received by the processor can be unlabeled; the electronic document data cam include electronic image data; the first electronic format type can be selected from a group consisting of a segment of text, a table, a figure, and a list; and the second electronic format type is selected from the group consisting of the segment of text, the table, the figure, and the list. The fourth sub-task performed by the CA machine learning model can further include generating a response to the inquiry based at least in part on the relevance of the first parsed labeled electronic format type to the inquiry; and the relevance of the second parsed labeled electronic format type to the inquiry the analysis.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

FIG. 6B depicts a diagram illustrating a multi-stage, multi-task training methodology in accordance with embodiments of the invention;

Figure 1:
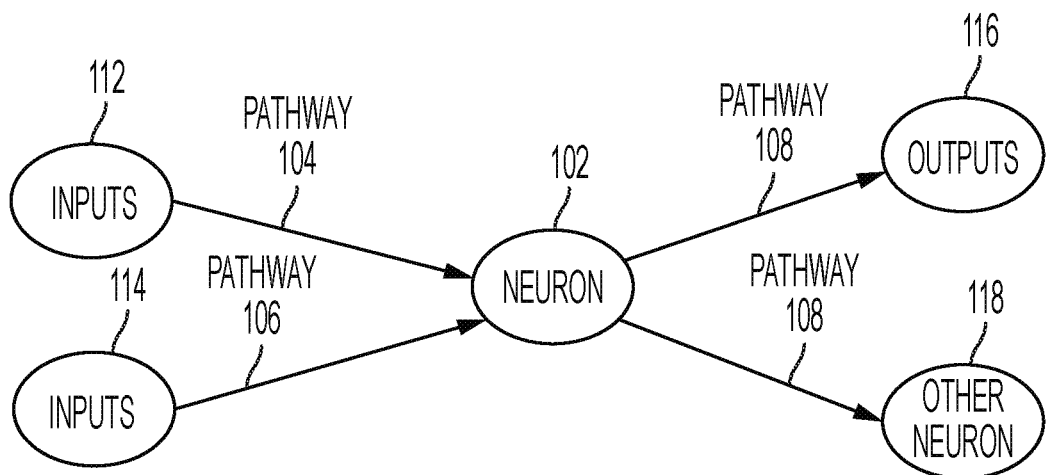
FIG. 1 depicts a simplified diagram of input and output connections of a biological neuron, which is a template for a deep-learning neural network architecture capable of implementing aspects of the invention.

In the accompanying figures and following detailed description of the disclosed embodiments, the various elements illustrated in the figures are provided with three-digit reference numbers. The leftmost digit of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the present invention apply to a wide variety of module implementations. For example, a module can be implemented as a hardware circuit configured to include custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. A module can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, include the module and achieve the stated purpose for the module.

Turning now to a more detailed description of technologies related to aspects of the invention, as previously noted herein, unstructured electronic information is not organized in a uniform format (i.e., it is not labeled or otherwise organized) and can include text, images, video, and audio material. Similarly, semi-structured electronic information includes some form of organization (e.g., some semantic labels/tags) but the chosen organization method lacks consistency, is not standardized, or has some other deficiency. Virtually all electronic information generated in the day-to-day functions of businesses, academic institutions, non-business enterprises, individuals, and other entities is unstructured and/or semi-structured. Unfortunately, it is difficult for known DCA systems to electronically read and process unstructured and/or semi-structured electronic information because it can be difficult to translate unstructured and/or semi-structured electronic information into numerical representations that can be consistently recognized and manipulated by a DCA system. Where the electronic information is an electronic document stored as a PDF file, and where the DCA system is a QA system, vital information that could be used by the QA system to provide an answer to a query is contained in unstructured tables, figures, and lists of the PDF document that are difficult (or impossible) for the known QA systems to access. For example, medical literature often summarizes important multi-group clinical study results in unstructured tables/figures of a PDF document.

In general, the results generated by a DCA system can be improved with access to more and better quality electronic information. Accordingly, it is expected that the performance of DCA systems would be improved if DCA systems had the ability to electronically read and understand unstructured and/or semi-structured electronic information in a manner that is efficient, consistent, and does not require large amounts of computing resources. However, known techniques for translating unstructured and/or semi-structured electronic information into numerical representations that can be recognized and processed by a DCA system must resort to so-called "brute force" algorithms (or analysis) to translate the unstructured and/or semi-structured electronic information. Brute force algorithms are algorithms and/or analysis processes that do not include any shortcuts to improve performance. Instead, brute force algorithms rely primarily on sheer computing power to try all possibilities for encoding the unstructured information until a solution to the subject problem (or task) is found. In addition to requiring a vast amount of computing resources, when the possible ways to encode unstructured or semi-structured electronic information is too large (i.e., above a threshold), brute force algorithms that rely on trying any and all possible encoding paths will not converge to a suitable encoding function.

Turning now to an overview of aspects of the invention, embodiments of the invention provide a novel multi-model neural network architecture and a novel multi-stage training methodology that efficiently and reliably translate unstructured and semi-structured training data and/or real world data-under-analysis into numerical representations of extracted features that can be recognized and manipulated by a modified DCA (or QA) sub-model of the neural network without relying on brute force analysis techniques. In embodiments of the invention, the modified DCA sub-model includes a standard DCA sub-model that has been trained (or pre-trained) on its conventional DCA functionality then modified with additional neutral network functionality that is trained to electronically read and analyze the above-described numerical representations of extracted features. Embodiments of the invention achieve these results by breaking the overall (or global) task of the neural network into auxiliary tasks, organizing the neural network architecture as multiple sub-models, and assigning each sub-model to at least one of the auxiliary tasks. In embodiments of the invention, the auxiliary tasks include parsing an unstructured document into its component parts or format types (e.g., lists, tables, figures, text, etc. of a PDF document), converting each component part into a set of numerical representations, and performing a computer-based analysis (e.g., DCA, NLP, machine learning, and the like) on each set of numerical representations.

As used herein, the terms "component part" and/or "format type" are used to describe a section of the instance of electronic information that requires a unique set of analysis operations in order for a machine learning model to effectively and efficiently read (electronically) and understand it without having to resort to brute force techniques. Embodiments of the invention leverage the observation that these "component parts" and/or "format types" require a unique set of analysis operations in order for a machine learning model to effectively and efficiently read (electronically) and understand it without having to resort to brute force techniques. Where the instance of electronic information is a PDF document that includes lists, figures, tables, and text, the lists, figures, tables, and text each requires a unique set of analysis operations in order for a machine learning model to effectively and efficiently read (electronically) and understand it without having to resort to brute force techniques. For example, the analysis operations required of a machine learning model to electronically read and understand an unstructured table without having to resort to brute force techniques is different from the analysis operations required of a machine learning model to electronically read and understand an unstructured figure without having to resort to brute force techniques.

In accordance with aspects of the invention, a novel (and non-brute-force) individual and joint (or multi-task) training protocol is implemented. In some embodiments of the invention, the novel individual and joint training protocol includes training (or pre-training) the sub-models in individual stages then jointly training all of the sub-models together in a single joint training stage. Because each of the individual sub-model tasks taken alone is less complex than the overall neural network task, training that proceeds from less complex individual task training to more complex joint task training makes it easier (compared to no joint training stages) for the overall neural network model to learn and converge, and further helps the sub-models to more efficiently learn to conduct the more complex overall task.

In some embodiments of the invention, the novel individual and joint training protocol includes training (or pre-training) the sub-models in individual stages then moving to multiple joint stages that are grouped based at least in part on the complexity of the auxiliary tasks. In this aspect of the invention, the initial training stages are individual training stages in which each sub-model is trained individually to perform its assigned auxiliary task. When each sub-model has learned its individual auxiliary task, the training protocol moves to group-based joint training stages that expand from lower complexity level groups to higher complexity level groups in order to improve how well the individual auxiliary tasks perform together. For example, if six (6) auxiliary tasks (A-F) are identified, each auxiliary task can be ranked or rated based on its complexity. On a complexity scale from one (1) to ten (10), auxiliary task A is rated at a complexity level of 3 (three); auxiliary tasks B-E are rated at complexity levels that range from four (4) to five (5); and auxiliary task F is rated at a complexity level of eight (8). In some embodiments of the invention, complexity ratings separated by 2 (two) or fewer complexity levels can be treated as having complexity levels that are close enough to be grouped, and complexity ratings separated by more than 2 (two) complexity levels can be treated as having complexity levels that are not close enough to be grouped. In this example, in accordance with aspects of the invention, the next training stage is a first joint training stage that trains the auxiliary tasks A-E together based on the closeness of their respective complexity levels. When the first joint training stage is complete, a second joint training stage adds the more complex auxiliary task F to the less complex group then jointly trains the auxiliary tasks A-F together.

In accordance with aspects of the invention, the weighted sum of the losses of the auxiliary tasks can be selected as a target parameter to optimize, and the first joint training stage is configured and arranged to improve the weighted overall performance of the auxiliary tasks A-E that have similar (and lower) complexity levels. In accordance with aspects of the invention, the first joint training stage updates the parameters of the sub-models assigned to auxiliary tasks A-E according to this target using standard deep learning techniques such as back-propagation and stochastic gradient descent. The second joint training stage is similar to the first joint training stage with the difference being that the more complex auxiliary task F and the loss associated with the sub-model assigned to perform the more complex auxiliary task F are added to the first joint training. Accordingly, in the second joint training stage, the parameters of all the auxiliary sub-models spanning all of the auxiliary task complexity levels are jointly updated, thereby improving the weighted overall performance of the neural network from end-to-end. In accordance with aspects of the invention, providing multiple joint training stages make it even easier (compared to one joint training stages) for the overall neural network model to learn and converge.

In aspects of the invention where the overall function of the neural network is a DCA operation, the above-described sub-models can include sequence-based recurrent neural networks (RNNs) having intermediate hidden states. The intermediate hidden states in the sub-models upstream from the previously-described modified DCA sub-model can be treated as encoded abstract representations of the unstructured electronic information, and the modified DCA sub-model is trained to use the encoded abstract representations as context to enable the modified DCA sub-model to provide results of its DCA analysis. In embodiments where the modified DCA sub-model is a modified QA sub-model, the modified QA sub-model is a standard QA sub-model that has been trained to use the abstract representations of the document as context to answer questions. Because the abstract representations provided to the modified QA sub-model are from the whole instance of unstructured electronic information (e.g., the whole PDF document), the modified QA sub-model now has access to information from all the different format types, which enables the modified QA model to learn to relate information from different format types (e.g., text and table) when needed by the modified QA sub-model to answer a question. The novel multi-model, multi-task trained neural network architecture ensures end-to-end differentiability, which means that the entire network architecture can differentiate at least the format-type and location of the data-under-analysis, which facilitates the global optimization of the neural network architecture through the joint and multi-task training techniques described herein.

Figure 2:
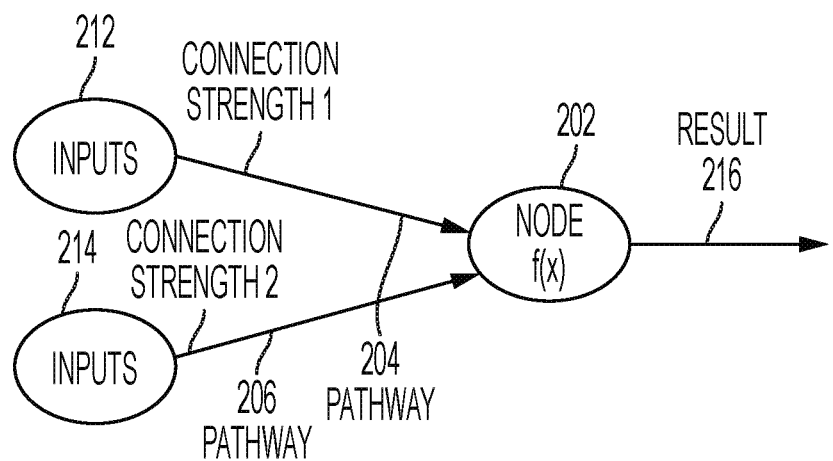
FIG. 2 depicts a simplified diagram illustrating a mathematical model inspired by the simplified biological neuron diagram shown in FIG. 1.
Figure 3A:
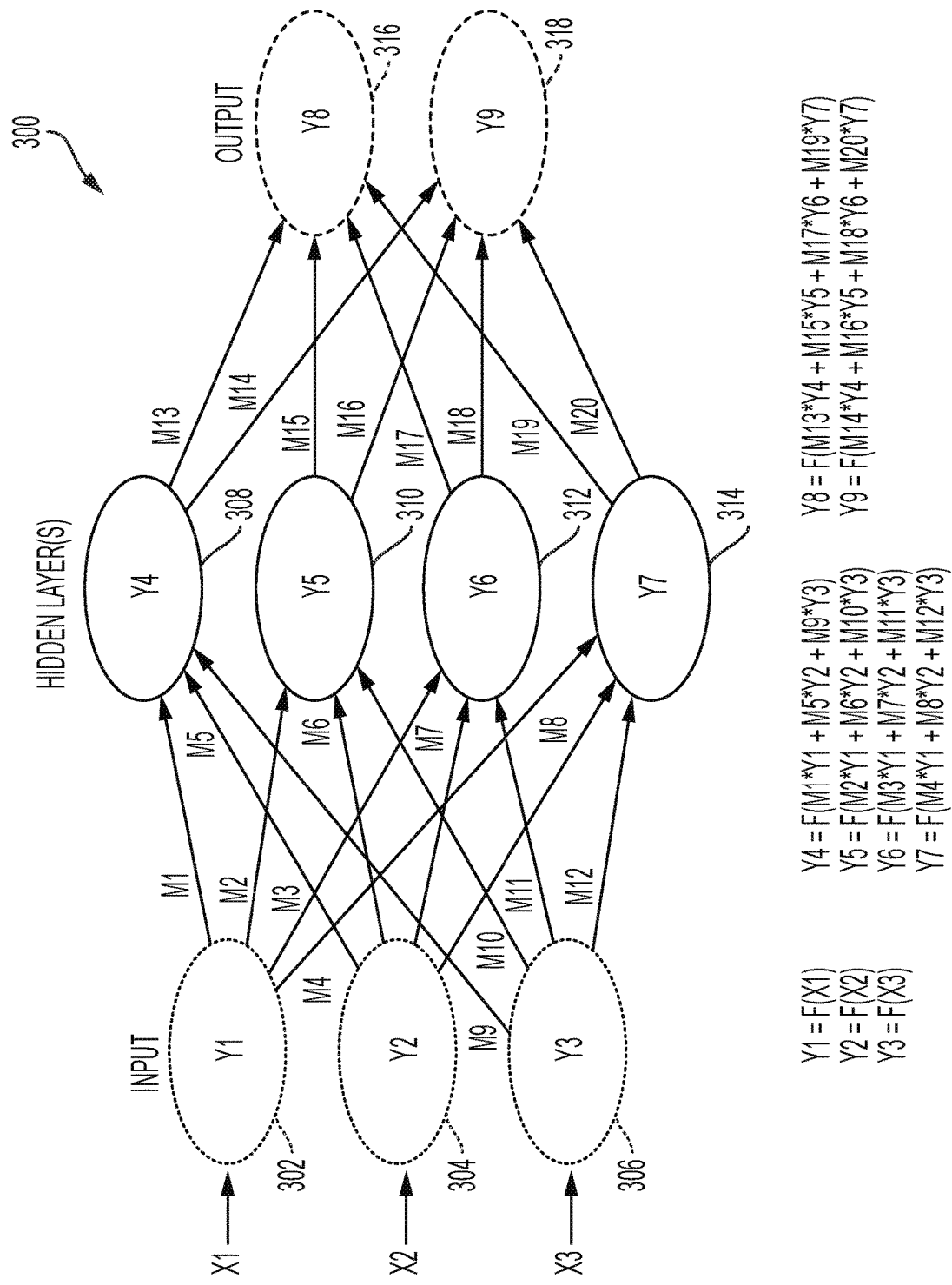
FIG. 3A depicts a simplified diagram illustrating a neural network layer architecture that incorporates the mathematical model shown in FIG. 2 and is a basic neural network framework capable of implementing aspects of the invention.
Figure 3B:
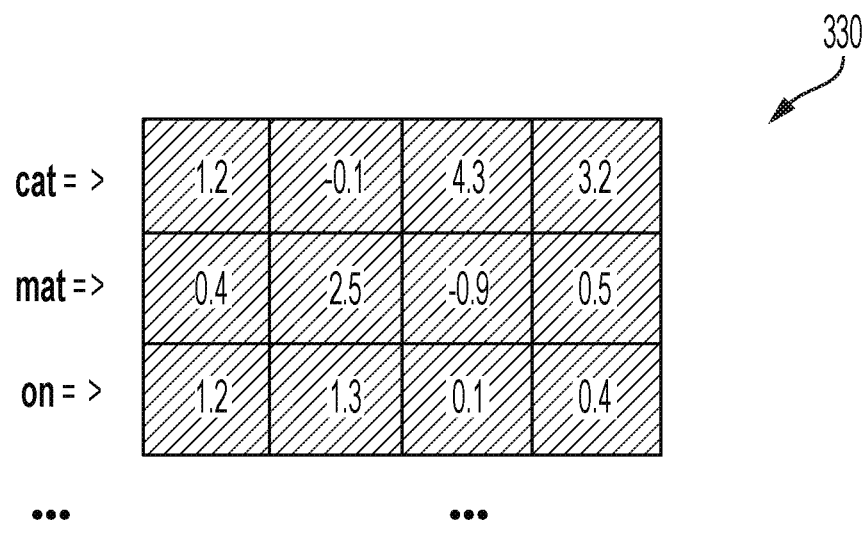
FIG. 3B depicts a simplified diagram illustrating an example type of word embedding capable of being used in connection with aspects of the invention.

Turning now to a more detailed description of aspects of the invention, FIGS. 1-3B depict various features of a neural network architecture 300 (shown in FIG. 3A) capable of implementing aspects of the invention. More specifically, FIG. 1 depicts a simplified diagram of input and output connections 112, 114, 116, 118 of a biological neuron 102, which provides a template for the neural network architecture 300. FIG. 2 depicts a simplified model of the biological neuron 102 shown in FIG. 1. FIG. 3A depicts a simplified neural network layer architecture 300 that incorporates the biological neuron model shown in FIG. 2. FIG. 3B depicts a simplified diagram illustrating a word embedding 330 of a type that is capable of being used in connection with aspects of the invention.

Turning to FIG. 1, there is depicted a simplified diagram of the biological neuron 102 having pathways 104, 106, 108, 110 that connect it to upstream inputs 112, 114, downstream outputs 116, and downstream "other" neurons 118, configured and arranged as shown. Each biological neuron 102 sends and receives electrical impulses through pathways 104, 106, 108, 110. The nature of these electrical impulses and how they are processed in biological neuron 102 are primarily responsible for overall brain functionality. The pathway connections 104, 106, 108, 110 between the biological neurons 102, 118 can be strong or weak. When the neuron 102 receives input impulses, the neuron 102 processes the input according to the neuron's function and sends the result of the function on pathway 108 to downstream outputs 116 and/or on pathway 110 to downstream "other" neurons 118. A normal adult human brain includes about one hundred billion interconnected neurons.

In FIG. 2, the biological neuron 102 (shown in FIG. 1) is modeled as a node 202 having a mathematical function, f(x), depicted by the equation shown in FIG. 2. Node 202 receives electrical signals from inputs 212, 214, multiplies each input 212, 214 by the strength of its respective connection pathway 204, 206, takes a sum of the inputs, passes the sum through a function, f(x), and generates a result 216, which may be a final output or an input to another node, or both. In the present specification, an asterisk (*) is used to represent a multiplication. Weak input signals are multiplied by a very small connection strength number, so the impact of a weak input signal on the function is very low. Similarly, strong input signals are multiplied by a higher connection strength number, so the impact of a strong input signal on the function is larger. The function f(x) is a design choice, and a variety of functions can be used. A suitable design choice for f(x) is the hyperbolic tangent function, which takes the function of the previous sum and outputs a number between minus one and plus one.

FIG. 3A depicts a simplified neural network architecture (or model) 300. In general, neural networks can be implemented as a set of algorithms running on a programmable computer (e.g., computer systems 800, 800A shown in FIGS. 4A and 8). In some instances, neural networks are implemented on an electronic neuromorphic machine (e.g., the IBM®/DARPA SyNAPSE computer chip) that attempts to create connections between processing elements that are substantially the functional equivalent of the synapse connections between brain neurons. In either implementation, neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical). The basic function of a neural network is to recognize patterns by interpreting sensory data through a kind of machine perception. Real-world data in its native form (e.g., images, sound, text, or time series data) is converted to a numerical form (e.g., a vector having magnitude and direction) that can be understood and manipulated by a computer. The neural network is "trained" by performing multiple iterations of learning-based analysis on the real-world data vectors until patterns (or relationships) contained in the real-world data vectors are uncovered and learned.

Neural network models take vectors (i.e., an array of numbers) as inputs. Where the inputs are natural language text, token/word vectorization refers to techniques that extract information from a text corpus and associate to each word of the text corpus a vector. For example, the word "king" can be associated with the vector (1, 4, −3, 2). This value can be computed using a suitable vectorization algorithm that takes into account the word's context.

Word embeddings are a way to use an efficient, dense vector-based representation in which similar words have a similar encoding. In general, an embedding is a dense vector of floating-point values. An embedding is an improvement over the more traditional bag-of-word model encoding schemes where large sparse vectors are used to represent each word or to score each word within a vector to represent an entire vocabulary. Such representations are considered to be sparse because the vocabularies can be vast, and a given word or document would be represented by a large vector having mostly zero token values. Instead, in an embedding, words are represented by dense vectors where a vector represents the projection of the word into a continuous vector space. The length of the vector is a parameter that must be specified. However, the values of the embeddings are trainable parameters (i.e., weights learned by the model during training in the same way a model learns weights for a dense layer). More specifically, the position of a word within the vector space of an embedding is learned from text and is based on the words that surround the word when it is used. The position of a word in the learned vector space of the word embedding is referred to as its embedding. Small datasets can have word embeddings that are as small as 8-dimensional, while larger datasets can have word embeddings as large as 1024-dimensions. A higher dimensional embedding can capture fine-grained relationships between words but takes more data to learn.

FIG. 3B depicts an example diagram of a word embedding 330. As shown in FIG. 3B, each word is represented as a 4-dimensional vector of floating-point values. Another way to think of the word embedding 330 is as "lookup table." After the weights have been learned, each word can be encoded by looking up the dense vector it corresponds to in the table. The Embedding layer (or lookup table) maps from integer indices (which stand for specific words) to dense vectors (their embeddings). The dimensionality (or width) of the embedding is a parameter that can be selected to match the task for which it is designed. When an embedding layer is created, the weights for the embeddings are randomly initialized (just like any other layer). During training, the weights are gradually adjusted via back-propagation training techniques. Once trained, the learned word embeddings will roughly encode similarities between words (as they were learned for the specific problem on which the model is trained).

Neural networks use feature extraction techniques to reduce the number of resources required to describe a large set of data. The analysis on complex data can increase in difficulty as the number of variables involved increases. Analyzing a large number of variables generally requires a large amount of memory and computation power. Additionally, having a large number of variables can also cause a classification algorithm to over-fit to training samples and generalize poorly to new samples. Feature extraction is a general term for methods of constructing combinations of the variables in order to work around these problems while still describing the data with sufficient accuracy.

Although the patterns uncovered/learned by a neural network can be used to perform a variety of tasks, two of the more common tasks are labeling (or classification) of real-world data and determining the similarity between segments of real-world data. Classification tasks often depend on the use of labeled datasets to train the neural network to recognize the correlation between labels and data. This is known as supervised learning. Examples of classification tasks include detecting people/faces in images, recognizing facial expressions (e.g., angry, joyful, etc.) in an image, identifying objects in images (e.g., stop signs, pedestrians, lane markers, etc.), recognizing gestures in video, detecting voices, detecting voices in audio, identifying particular speakers, transcribing speech into text, the like. Similarity tasks apply similarity techniques and (optionally) confidence levels (CLs) to determine a numerical representation of the similarity between a pair of items.

Returning again to FIG. 3A, the simplified neural network architecture/model 300 is organized as a weighted directed graph, wherein the artificial neurons are nodes (e.g., 302, 308, 316), and wherein weighted directed edges (e.g., m1 to m20) connect the nodes. The neural network model 300 is organized such that nodes 302, 304, 306 are input layer nodes, nodes 308, 310, 312, 314 are hidden layer nodes, and nodes 316, 318 are output layer nodes. Each node is connected to every node in the adjacent layer by connection pathways, which are depicted in FIG. 3A as directional arrows having connection strengths m1 to m20. For ease of illustration and explanation, one input layer, one hidden layer, and one output layer are shown in FIG. 3A. However, in practice, multiple input layers, multiple hidden layers, and multiple output layers can be provided. When multiple hidden layers are provided, the neural network model 300 can perform unsupervised deep-learning for executing classification/similarity type tasks.

Similar to the functionality of a human brain, each input layer node 302, 304, 306 of the neural network 300 receives inputs x1, x2, x3 directly from a source (not shown) with no connection strength adjustments and no node summations. Accordingly, y1=f(x1), y2=f(x2) and y3=f(x3), as shown by the equations listed at the bottom of FIG. 3A. Each hidden layer node 308, 310, 312, 314 receives its inputs from all input layer nodes 302, 304, 306 according to the connection strengths associated with the relevant connection pathways. Thus, in hidden layer node 308, y4=f (m1*y1+m5*y2+m9*y3), wherein * represents a multiplication. A similar connection strength multiplication and node summation is performed for hidden layer nodes 310, 312, 314 and output layer nodes 316, 318, as shown by the equations defining functions y5 to y9 depicted at the bottom of FIG. 3A.

The neural network model 300 processes data records (or other forms of electronic information) one at a time, and it "learns" by comparing an initially arbitrary classification of the record with the known actual classification of the record. Using a training methodology knows as "back-propagation" (i.e., "backward propagation of errors"), the errors from the initial classification of the first record are fed back into the network and used to modify the network's weighted connections the second time around, and this feedback process continues for many iterations. In the training phase of a neural network, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the network's calculated values for the output nodes to these "correct" values, and to calculate an error term for each node (i.e., the "delta" rule). These error terms are then used to adjust the weights in the hidden layers so that in the next iteration the output values will be closer to the "correct" values.

There are many types of neural networks, but the two broadest categories are feed-forward neural networks and recurrent neural networks. The neural network model 300 is a non-recurrent feed-forward network having inputs, outputs and hidden layers. The signals can only travel in one direction. Input data is passed onto a layer of processing elements that perform calculations. Each processing element makes its computation based upon a weighted sum of its inputs. The new calculated values then become the new input values that feed the next layer. This process continues until it has gone through all the layers and determined the output. A threshold transfer function is sometimes used to quantify the output of a neuron in the output layer.

Figure 4A:
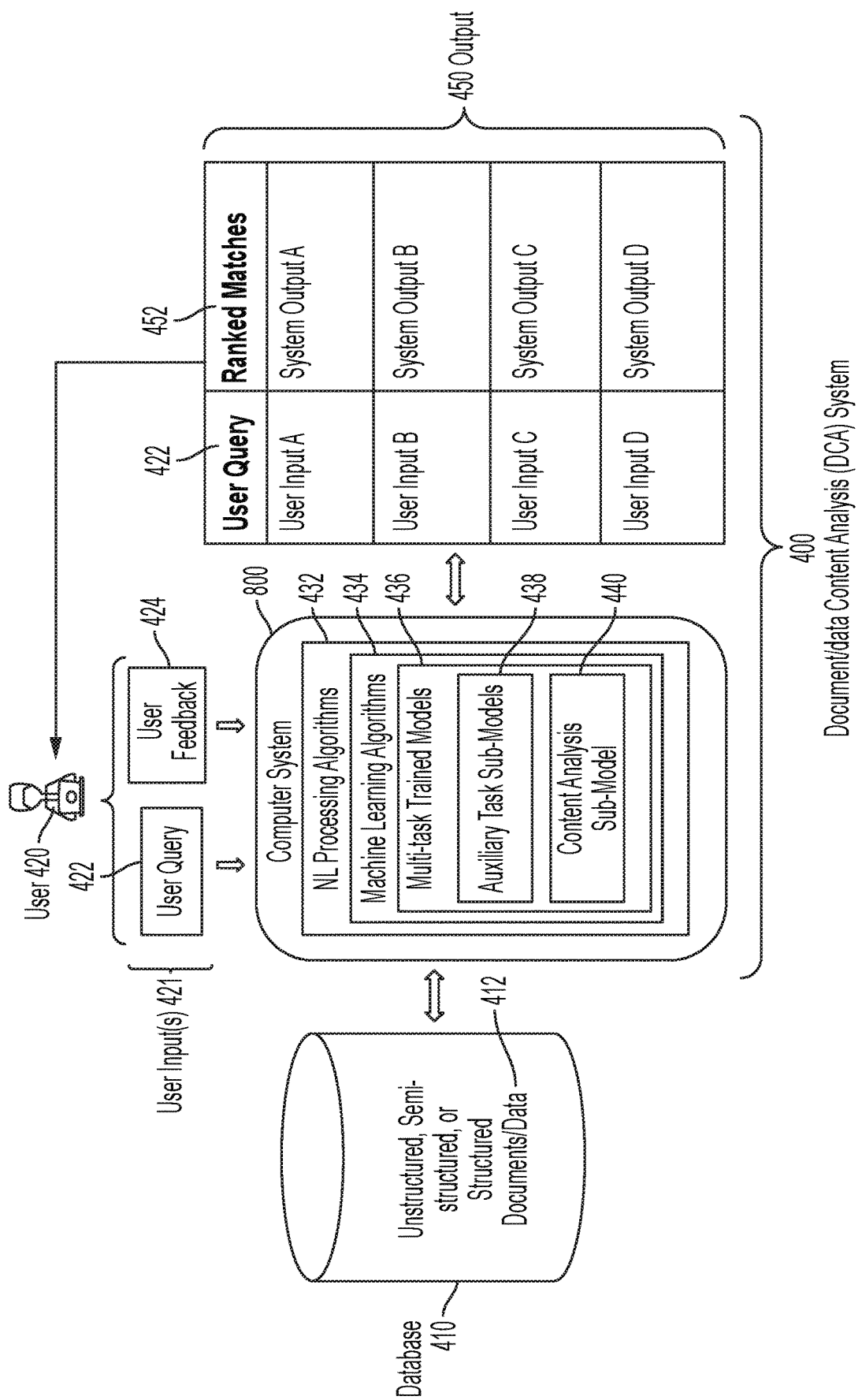
FIG. 4A depicts a block diagram of a computer-based document/data content (DCA) analysis system embodying aspects of the invention.

FIG. 4A depicts a block diagram of a document/data content analysis (DCA) system 400 embodying aspects of the invention. The DCA system 400 includes a computer system 800 communicatively coupled to a database 410. The database 410 stores or otherwise has access to real-world data that can include electronic versions of unstructured, semi-structured, or structured documents 412. Unstructured documents/data are not organized into a uniform format (i.e., they are not labeled or otherwise organized) and can include text, images, video, and audio material. The vast amount of documents/data generated in the day-to-day functions of businesses, academic institutions, non-business enterprises, and individuals is unstructured. Semi-structured documents/ data includes some form of organization (e.g., semantic labels/tags) but the chosen organization method lacks consistency, is not standardized, or has some other deficiency. Structured documents/data are well-organized using an organized and consistent format, including, for example, attaching labels to the documents/data and/or organizing the documents/data into an addressable repository or a database. In some embodiments of the invention, the documents/data 412 are structured. In some embodiments of the invention, the documents/data 412 are semi-structured. In some embodiments of the invention, the documents/data 412 are unstructured. A feature of embodiments of the invention is that the DCA system 400 is configured to process unstructured and semi-structured versions of the documents/data 412 as well as it processes structured versions of the documents/data 412. The documents/data 412 are shown in a single database 410 for ease of illustration. In some embodiments of the invention, the documents/data 412 can be spread among multiple separate databases.

The computer system 800 implements a neural network having input layers, hidden layers, output layers, nodes, and weighted connections that operate in accordance with the general functionality of the neural network 300 (shown in FIG. 3A) and that further includes natural language processing algorithms 432, novel machine learning algorithms 434, and a configuration of novel multi-task trained models 436, configured and arranged as shown. In operation, the computer system 800 receives user inputs 421 from a user 420. In aspects of the invention, the user inputs 421 include a more general user input 422 and a specialized user input in the form of user feedback 424. In response to receiving the user input 422, the computer system 800 is configured to access the database 410 to retrieve and analyze documents/data 412 and prepare it for downstream analysis by a CA (content analysis) sub-model of the multi-task trained models 436. In aspects of the invention, the user input 422 is a natural language question, and the multi-task trained models 436 are configured and arrange to analyze the documents/data 412 and determine whether or not the documents/data 412 provide or contribute to providing an answer to the natural language question.

In operation, the natural language processing algorithms 432 and the novel machine learning algorithms 434 work together to train/learn the functionality of the novel multi-task trained models 436 in accordance with aspects of the invention. The analysis performed by the natural language processing algorithms 432 and the machine learning algorithms 436 includes understanding the layout of the document/data 412 by parsing and labeling the various format types in the document/data 412; translating the labeled documents/data 412 to numerical data (e.g., tokens, vectors, and the like); and applying a series of novel hidden-layer processes to the numerical data that, in effect, "train" the novel multi-task trained models 436 so they can represent (or model) a response (e.g., output 450) to the substance of the user input 422. When the novel multi-task trained models 436 are sufficiently trained, new user input 422 and/or user feedback 424 can be applied to the novel multi-task trained models 436 for analysis.

As previously noted herein, in operation, the natural language processing algorithms 432 and the novel machine learning algorithms 434 work together to train/learn, in a novel way, the required functionality of the novel multi-task trained models 436 in accordance with aspects of the invention. In aspects of the invention, the natural language processing algorithms 432 and the novel machine learning algorithms 434 extract features from training data and/or the documents/data 412 in order to construct the multi-task trained models 436.

In embodiments of the invention, the multi-task trained models 436 include auxiliary task sub-models 438, which include a document/data layout model configured and arranged to identify and label the various electronic format types that are present in the document/data 412. As a non-limiting example, the document/data 412 can be an electronic image (e.g., a PDF image) of a document that includes electronic format types including, for example, images of figures; images of diagrams; images of natural language text in paragraph form; images of lists; and images of tables that organize words, numerical data, equations, and the like. In embodiments of the invention, the document/data layout model can be an object detection model configured and arranged to locate objects of interest (e.g., text, a table, a list, a figure, etc.) in the electronic image with respect to the background. In embodiments of the invention, the object detection task/problem can be solved by placing a tight bounding box (Bbox) around the objects of interest and associating the correct object category with each bounding box.

In embodiments of the invention, the auxiliary task sub-models 438 further include format type understanding sub-models, wherein at least one of the format understanding sub-models is configured and arranged to be dedicated to an electronic format type identified and labeled as regions/objects of interest by the document/data layout sub-model. Continuing with the example where the documents/data 412 are unstructured or semi-structured electronic images of documents, the documents/data will include at least one format type understanding sub-model dedicated to understanding the images; at least one format type understanding sub-model dedicated to understanding the diagrams; at least one format type understanding sub-model dedicated to understanding the natural language text in paragraph form; and at least one format type understanding sub-model dedicated to understanding the tables that organize words, numerical data, equations, and the like. Each format type understanding sub-model is configured and arranged to receive its labeled format types from the document/data layout sub-model, extract features and data structures of the format type to which it is dedicated. In accordance with aspects of the invention, the features and data structures extracted from the labeled format types by the format type understanding sub-models is configured and arranged to match information that is required by a downstream content analysis sub-model 440.

In embodiments of the invention, the format type understanding sub-models can each be implemented as encoder-decoder sub-models configured and arranged to operate in a recurrent neural network (RNN) for a sequence-to-sequence prediction problem. The encoder-decoder sub-model(s) include an encoder sub-model communicatively coupled to a decoder sub-model. The encoder sub-model is responsible for stepping through the input time steps and encoding the entire sequence into a fixed length vector called a context vector. The decoder sub-model is responsible for stepping through the output time steps while reading from the context vector.

In embodiments of the invention, the above-described encoder-decoder sub-models can be implemented with attention. A problem with encoder-decoder sub-models is that performance can degrade when the input and/or output sequences are relatively long. The reason is believed to be because of the fixed-sized internal representation used by the encoder sub-model. Attention is an extension applied to the encoder-decoder sub-models that address this limitation. In some embodiments of the invention, the attention technique can work by first providing a richer context from the encoder sub-model(s) to the decoder sub-model(s) and a learning mechanism where the decoder sub-model(s) can learn where to pay attention in the richer encoding sub-model(s) when predicting each time step in the output sequence.

The multi-task trained models 436 further include a modified CA sub-model 440. In embodiments of the invention, the modified CA sub-model 440 includes a standard CA sub-model that has been trained (or pre-trained) on its conventional CA functionality then modified with additional neutral network functionality that is trained to electronically read and analyze the numerical representations of extracted features generated by the auxiliary sub-models 438. More specifically, in embodiments of the invention, the modified CA sub-model 440 is configured and arranged to receive the features and data structures of the labeled format types and perform a content analysis function to which the modified CA sub-model 440 is dedicated. In aspects of the invention, the modified CA sub-model 440 is configured and arranged to electronically and automatically perform research using the categorization and classification of speech, written text, interviews, images, or other forms of communication. In some embodiments of the invention, the modified CA model 440 can be a computer-implemented QA sub-model configured and arranged to use the natural language processing algorithms 432 and machine learning algorithms 434 to analyze the features and data structures of the labeled format types in order to provide answers to open-ended natural language questions. In embodiments of the invention where the format type understanding models are each an encoder-decoder model, and in embodiments of the invention where the CA model is a QA model, the encoder converts images of document components into abstract representations, which are used by the decoder to generate sequences of text and HTML tags. The hidden states of the decoder are sent to the QA model as context to answer questions.

In embodiments of the invention, the multi-task trained models 436 are trained according to a novel end-to-end, multi-task training technique. In embodiments of the invention, the novel end-to-end, multi-task training technique trains related tasks of the multi-task trained models 436 (i.e., the document/data layout recognition sub-model; the dedicated format type understanding sub-models; and the DCA sub-model) end-to-end such that the multi-task trained models 436 share parameters or weights, thereby globally optimizing performance of the multi-task trained models 436. In embodiments of the invention, the novel end-to-end, multi-task training technique trains the multi-task trained models 436 (i.e., the document/data layout recognition sub-model; the dedicated format type understanding sub-models; and the DCA sub-model) by pre-training the document/data layout sub-model individually; pre-training each of the dedicated format type understanding sub-models individually; jointly training the document layout recognition sub-model and each of the dedicated format type understanding sub-models based at least in part on shared parameters of the document/data layout recognition sub-model and each of the dedicated format type understanding sub-models; and jointly training the document/data layout recognition sub-models, each of the dedicated format type understanding sub-models, and the DCA sub-model based at least in part on shared parameters of the document/data layout recognition sub-models, each of the dedicated format type understanding sub-models, and the DCA sub-model. In accordance with aspects of the invention, the shared parameters are the sets of weights that determine the connection strengths between pairs of nodes in the above-described jointly trained sub-models. Models that share parts of their architecture (e.g., a subset of layers) have shared parameters if they use the same sets of weights for some or all of the layers in the shared architecture.

The computer system 800 generates an output 450 in a flexible format and structure that captures the relationship between user input 422 and the documents/data 412 having content that is responsive/relevant to the user input 422. The format of the output 450 shown in FIG. 4A is a table that matches the system output, wherein the system output is the specific document/data 412 that is responsive/relevant to the user input 422, along with the specific portion(s) of the document/data 412 that is responsive/relevant to the user input 422. The specific format and structure of the output 450 shown in FIG. 4A is one example, and the DCA system 400 can be programmed to generate the output 450 in other formats and structures that match the specific user input 422 and the specific embodiments of the multi-task trained models 436 that are being used.

In embodiments of the invention, the user inputs 421 can also include user training feedback 424 from the user 420. The user training feedback 424 can be generated by the user 420 based on a review by the user 420 of the output 450. In embodiments of the invention, the format of the output 450 can include a user feedback region where the user 420 can electronically enter user feedback about one or more of the system outputs A, B, C, D in the returned output 450. The computer system 800 can receive the user training feedback 424 through a user feedback region that can be made part of the format of the output 450. The computer system 800 can be configured to provide the user training feedback 424 to the machine learning algorithms and classification/similarity algorithms 434, which are configured to use the user training feedback 424 (e.g., through making the appropriate adjustments to the weights used in the multi-task trained models 436) to further train the multi-task trained models 436. In some embodiments of the invention, the output 450 can include an automatically generated dialogue box that is displayed to the user 420 (e.g., through the input/output component 812 shown in FIG. 8) and is configured to prompt the user 420 to provide the user training feedback 424 in the user feedback region of the output 450. In embodiments of the invention, the user training feedback 424 can identify the user-input/system-output pairs returned by the multi-task trained model 436 where the documents/data and the text in the returned code/text pair are relevant to one another. In embodiments of the invention, the user training feedback 424 can identify the user-input/system-output pairs returned by the multi-task trained model 436 where the documents/data and the text returned in the code/text that are not relevant to one another. In some embodiments of the invention, the user training feedback 424 can be provided on a scale, for example, a scale ranging from 1 through to 10, where 10 indicates that the user-input/system-output pairs returned by the multi-task trained model 436 are 100% relevant to one another, and where 1 indicates that the user-input/system-output pairs returned by the multi-task trained model 436 are 0% relevant to one another. In aspects of the invention, the user training feedback 424 is only utilized during an initial training of the novel classification/similarity model 436. In aspects of the invention, the user training feedback 424 can be utilized during periodic post-initial-training (or updated) training of the novel classification/similarity model 436.

Figure 4B:
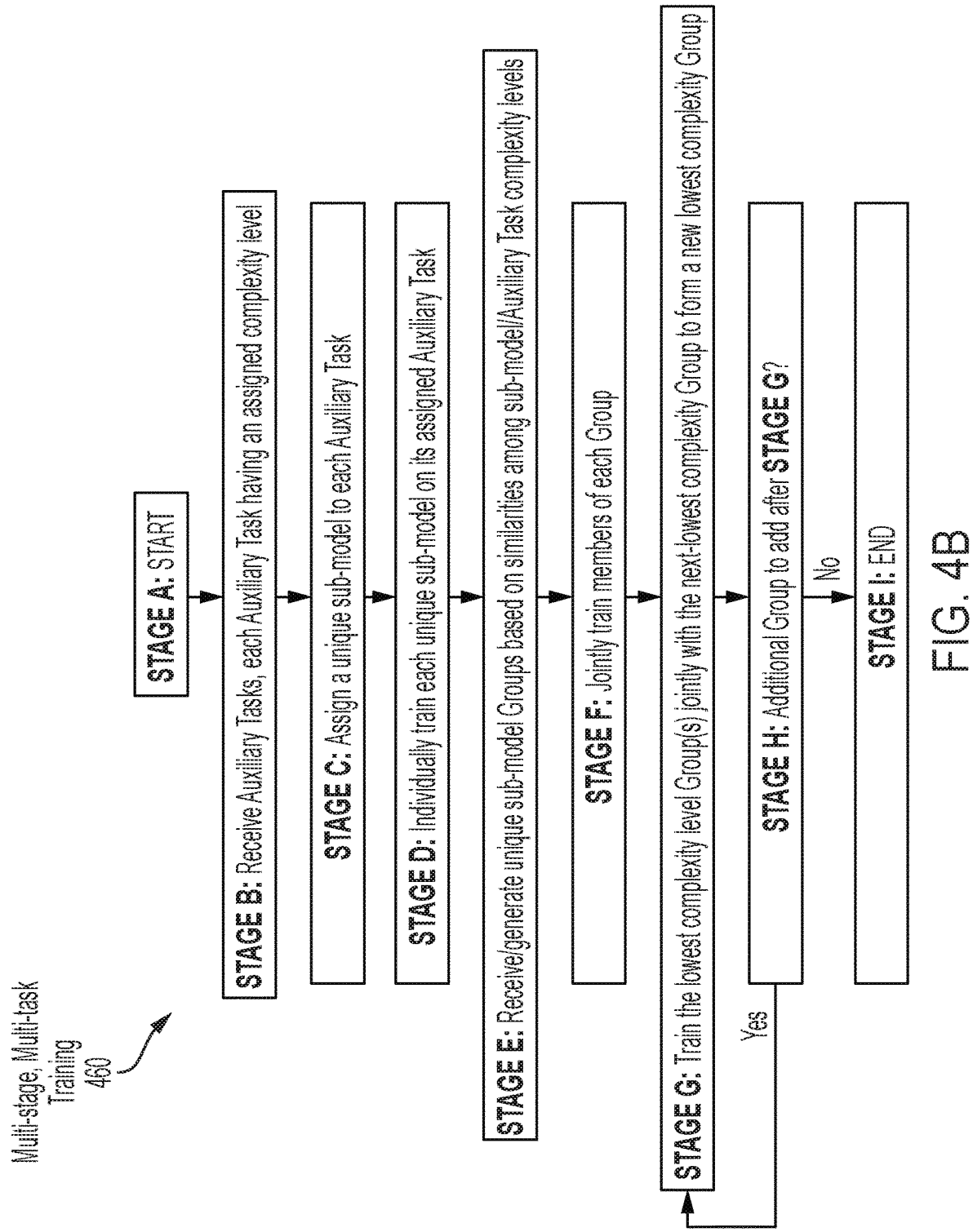
FIG. 4B depicts a diagram illustrating a multi-stage, multi-task training methodology in accordance with embodiments of the invention.

FIG. 4B depicts a diagram illustrating a multi-stage, multi-task training methodology 460 in accordance with embodiments of the invention. The training methodology 460 is implemented by the computer system 800 (shown in FIG. 4A) as part of a process for creating the DCA system 400 (shown in FIG. 4A). In accordance with aspects of the invention, the training methodology 460 starts at STAGE A then moves to STAGE B where the computer system 800 (shown in FIG. 4A) receives auxiliary tasks that have each been assigned a complexity level. In some embodiments of the invention, each auxiliary task can be identified and assigned to (or associated with) its complexity level manually or by a system that is separate from (or incorporated within) the computer system 800. In some embodiment of the invention, a system that identifies auxiliary tasks from the overall task then associates the auxiliary tasks with a complexity level can be performed by training the natural language processing algorithms 432 and the novel machine learning algorithms 434 to generate a model that receives an overall task, breaks the overall task into auxiliary tasks, and assigns a complexity level to each auxiliary task. The training methodology 460 moves to STAGES C and D and uses the computer system 800 to assign a unique sub-model (or sub-models) to each auxiliary task then individually train each unique sub-model (or sub-models) on its assigned auxiliary task.

At STAGE E, the training methodology 460 is further configured to receive/generate groupings of the unique sub-models based on similarities, if any, among the complexity levels of each sub-model's auxiliary task. For example, if eight (8) auxiliary tasks (A-H) are identified, each auxiliary task can be ranked or rated based on its level of complexity. On a complexity scale from one (1) to ten (10), auxiliary task A is rated at a complexity level of two (2); auxiliary tasks B-D are rated at complexity levels that range from three (3) to four (4); auxiliary tasks E and F are each rated at a complexity level of seven (7); and auxiliary tasks G and H are each rated at a complexity level of ten (10). In some non-limiting embodiments of the invention, complexity levels separated by 2 (two) or fewer complexity levels can be treated as having complexity levels that are close enough to be grouped, and complexity levels that are separated by more than 2 (two) complexity levels can be treated as having complexity levels that are not close enough to be grouped. In the above-described example, Group One includes the sub-models assigned to auxiliary tasks A-D; Group Two includes the sub-models assigned to auxiliary tasks E-F; and Group Three includes the sub-models assigned to auxiliary tasks G-H. In some embodiments of the invention, the complexity level groupings described above can be generated manually (or by a system separate from or incorporated within the DCA system 400) then provided to the computer system 800. In some embodiment of the invention, the natural language processing algorithms 432 (shown in FIG. 4A) and the novel machine learning algorithms 434 (shown in FIG. 4A) can be trained to generate a model that receives the output of STAGE D and generates the complexity level groups described above.

At STAGE F, the training methodology 460 executes a first joint training that jointly trains, in any order, the sub-models in Group One; the sub-models in Group Two; and the sub-models in Group Three. At STAGE G, the training methodology 460 executes a second joint training that trains the lowest complexity level group (Group One) with the next-lowest complexity group (Group Two). STAGE H determines whether there are any additional groups after STAGE G. If the answer to the inquiry at STAGE H is yes, the training methodology 460 performs another iteration of STAGE G. Continuing with the preceding example, in the second iteration of STAGE G, the training methodology 460 executes a third joint training that trains the lowest complexity level group (Group One trained with Group Two) with the next-lowest complexity group (Group Three). If the answer to the inquiry at STAGE H is no, the training methodology 460 moves to STAGE I and ends.

In some embodiments of the invention, STAGES G and H of the training methodology 460 can be replaced with a single stage that jointly trains Group One, Group Two, and Group Three without taking into consideration the difference in the complexity levels of Group One, Group Two, and Group Three.

In accordance with aspects of the invention, the novel complexity-level-based multi-task training features of the training methodology 460 make it even easier (compared to brute force training methodologies) for the DCA system 400 (shown in FIG. 4A) to learn and converge, even when electronic information (e.g., documents/data 412 shown in FIG. 4A) that is analyzed by the DCA system 400 is unstructured or semi-structured.

Figure 5:
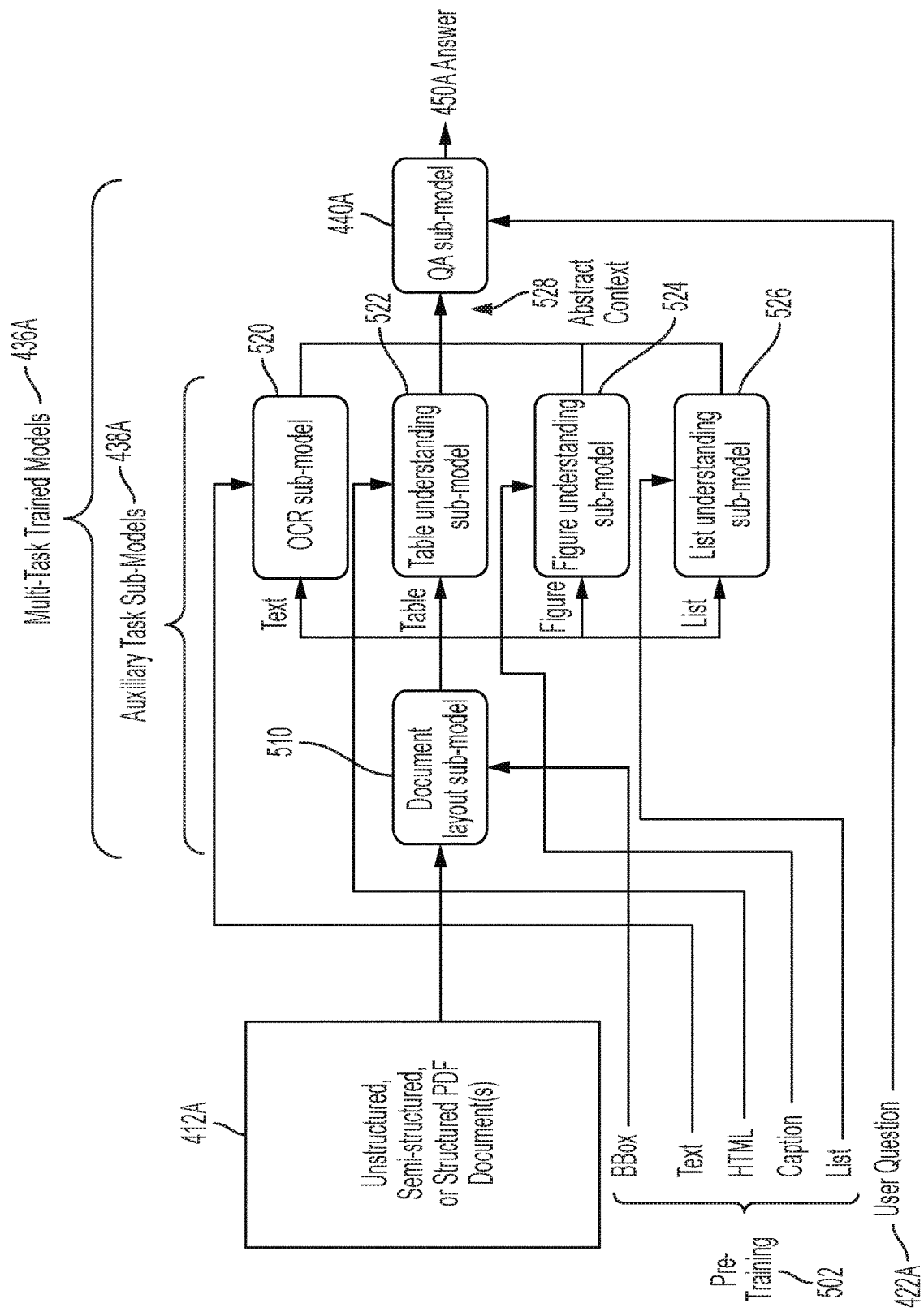
FIG. 5 depicts a block diagram illustrating an example implementation of the multi-task trained models of the computer-based DCA system shown in FIG. 4A.

FIG. 5 depicts a block diagram illustrating a configuration of multi-task trained models 436A, which is an example implementation of the multi-task trained models 436 (shown in FIG. 4A) of the computer-based DCA system 400 (shown in FIG. 4A). The multi-task trained models 436A have the same general features as the multi-task trained models 436, and they interface with the natural language processing algorithms 432 (shown in FIG. 4A) and the machine learning algorithms 434 (shown in FIG. 4A) in substantially the same manner as the multi-task trained models 436, except the multi-task trained models 436A are configured and arranged to perfume the more specific content analysis task of analyzing images of documents 412A (e.g., in a PDF format) to determine whether the document(s) 412A include information that can be used by a modified QA model 440A of the multi-task trained models 436A to generate an answer 450A to a user input 422 (shown in FIG. 4A) presented in the form of a user question 422A. In embodiments of the invention, the documents 412A can be structured, semi-structured, and/or unstructured.

In embodiments of the invention, the auxiliary task sub-models 438A include a document layout recognition sub-model 510 assigned the auxiliary task of electronically reading and recognizing how a PDF document 412A is organized then parsing the PDF document 412A into various segments referred to herein as component parts or format types. Upon performing the auxiliary task of electronically recognizing and parsing the format types used in the PDF document 412A, the layout recognition sub-model 510 generates numerical data (e.g., tokens, vectors, and the like) identifying each format type and sends that data to a next level of sub-models, which include an optical character recognition (OCR) sub-model 520, a table understanding sub-model 522, a figure understanding sub-model 524, and a list understanding sub-model 526. For ease of reference, the OCR sub-model 520, the table understanding sub-model 522, the figure understanding sub-model 524, and the list understanding sub-model 526 are referred to herein as format-type understanding sub-models. In aspects of the invention, the layout recognition model 510 generates numerical data identifying regions of text, table, figure, and lists contained within the PDF document 412A.

In embodiments of the invention, the format-type understanding sub-models (e.g., OCR sub-model 520, table understanding sub-model 522, figure understanding sub-model 524, list understanding sub-model 526) include one format-type understanding sub-model for each format type identified by the layout recognition sub-model 510. Each format-type understanding sub-model (e.g., OCR sub-model 520, table understanding sub-model 522, figure understanding sub-model 524, list understanding sub-model 526) is dedicated to its assigned auxiliary task, namely performing a set of analysis operations required in order for the format-type understanding sub-model to electronically read and understand the format type to which it has been assigned. As previously noted, the format-type understanding sub-models can include an OCR sub-model 520, a table understanding sub-model 522, a figure understanding sub-model 524, and a list understanding sub-model 526. Each of the above-described format-type understanding sub-models receives from the layout recognition sub-model 510 the numerical data that represents the format type (i.e., text, tables, figures, lists, and the like) to which the format-type understanding sub-model has been assigned. Each format-type understanding sub-model (e.g., OCR sub-model 520, table understanding sub-model 522, figure understanding sub-model 524, list understanding sub-model 526) executes its unique set of analysis operations to electronically read and understand the format type to which the format-type understanding sub-model has been assigned. For example, the unique set of analysis operations executed by the OCR sub-model 520 can include converting image regions of text into editable text. The unique set of analysis operations executed by the table understanding sub-model 522 can include converting image regions of tables into HTML (hyper text markup language) code. The unique set of analysis operations executed by the figure understanding sub-model 524 can include converting image regions of figures into short summarizing text (or captions). The unique set of analysis operations executed by the list understanding sub-model 526 can include converting image regions of lists into lists of text. Upon performing the auxiliary task of electronically reading and understanding the format type to which it has been assigned, each instance of the format-type understanding models (e.g., OCR model 520, table understanding model 522, figure understanding model 524, list understanding model 526) generates numerical data (e.g., abstract context data 528) representing its assigned format type and sends it to a next level of sub-models that includes the modified QA sub-model 440A.

In embodiments of the invention, the QA sub-model 440A is dedicated to its assigned QA task. In embodiments of the invention, the assigned QA task can be considered one of the auxiliary tasks of the global task to be performed by the system 400 (shown in FIG. 4A). In embodiments of the invention, the modified QA sub-model 440A includes a standard QA sub-model (e.g., QA sub-model 440C shown in FIG. 7A) that has been trained (or pre-trained) on its conventional QA functionality then modified with additional neutral network functionality (e.g., RNNs 730, 732, 734, 736, abstract context encoding 738, and abstract query encoding 750 shown in FIG. 7A) that enables the standard QA sub-model to read sequence data generated by the format-type understanding sub-models. Accordingly, in embodiments of the invention, the task assigned to the QA sub-model 440A can be to analyze the outputs from the format-type understanding sub-models (e.g., OCR sub-model 520, table understanding sub-model 522, figure understanding sub-model 524, list understanding sub-model 526) to identify the portion(s) of the PDF document 412A that can be used to generate an answer 450A to a user question 422A input to the QA sub-model 440A.

In accordance with aspects of the invention, the format-type understanding sub-models (e.g., OCR sub-model 520, table understanding sub-model 522, figure understanding sub-model 524, list understanding sub-model 526) and the QA sub-sub-model 440A form the multi-task trained models 436A that correspond to (i.e., have the features of) the previously described multi-task trained model 436 (shown in FIG. 4A). In accordance with aspects of the invention, the multi-task trained models 436A are trained using one or more individual pre-training stages combined with one or more joint training stages. The individual and joint training stages are configured to guide the multi-task trained models 436A to efficiently learn to understand the unstructured or semi-structured PDF document 412A. In embodiments of the invention, each of the multi-task trained models 436A is trained (or pre-trained) individually on its assigned auxiliary task, and then the multi-task trained models 436A are trained jointly.

In the individual training stages, pre-training data 502 is provided as training supervisions to the auxiliary task sub-models 438A. The pre-training operations applied to the layout recognition sub-model 510 includes using the pre-training data 502 (specifically, the bounding box (Bbox) data that identifies a particular location on an image) and the PDF document 412A to train the layout recognition sub-model 510 to perform its unique set of analysis operations, which can include electronically recognizing and parsing the format types (e.g., text, tables, figures, lists, etc.) used in the PDF document 412A. The pre-training operations applied to the OCR sub-model 520 includes using text-related supervisions from the pre-training data 502 to train the OCR sub-model 520 to perform its unique set of analysis operations, which can include converting image regions of text received from the document layout sub-model 510 into editable text (e.g., using OCR techniques). The pre-training operations applied to the table understanding sub-model 522 includes using table-related supervisions from the pre-training data 502 to train the table understanding sub-model 522 to perform its unique set of analysis operations, which can include converting image regions of tables into HTML code. The pre-training operations applied to the figure understanding sub-model 524 includes using figure-related supervisions from the pre-training data 502 to train the figure understanding sub-model 524 to perform its unique set of analysis operations, which can include converting image regions of figures into short summarizing text (or captions). The pre-training operations applied to the list understanding sub-model 526 includes using list-related supervisions from the pre-training data 502 to train the list understanding sub-model 526 to perform its unique set of analysis operations, which can include converting image regions of lists into lists of text.

When the layout recognition sub-model 510 and the format-type understanding sub-models (e.g., OCR sub-model 520, table understanding sub-model 522, figure understanding sub-model 524, list understanding sub-model 526) have been trained to perform their assigned tasks, in accordance with aspects of the invention, the multi-task trained models 436A are trained according to a novel end-to-end, multi-task training technique. In embodiments of the invention, the novel end-to-end, multi-task training technique trains related tasks of the multi-task trained models 436A (i.e., the document/data layout recognition sub-model 510; the dedicated format type understanding sub-models (e.g., OCR sub-model 520, table understanding sub-model 522, figure understanding sub-model 524, list understanding sub-model 526); and the QA sub-model 440A) end-to-end such that the multi-task trained models 436A share parameters or weights, thereby globally optimizing performance of the multi-task trained models 436A. In embodiments of the invention, the novel end-to-end, multi-task training technique includes a two-stage joint training in which a first one of the two joint training stages jointly trains the auxiliary task sub-models 438A and a second one of the two joint training stages jointly trains the multi-task trained models 436A. In accordance with embodiments of the invention, the tasks in the first joint training stage are related in that they have similar complexity levels, which can be determined using one of the methodologies previously described herein. In accordance with aspects of the invention, the weighted sum of the losses of the auxiliary task sub-model 438A can be selected as a target parameter to optimize, and the first joint training stage is configured and arranged to improve the weighted overall performance of the auxiliary task sub-models 438A. In accordance with aspects of the invention, the first joint training stage updates the parameters of the auxiliary task sub-models 438A according to this target using standard deep learning techniques such as back-propagation and stochastic gradient descent. The second joint training stage is very similar to the first joint training stage with the difference being that the more complex (i.e., more complex than the tasks in the first joint training stage) multi-task trained models 436A and the loss associated therewith are added to the first joint training. Accordingly, in the second joint training stage, the parameters of all the multi-task trained models 436A are jointly updated, thereby improving the weighted overall performance of the multi-task trained models 436A from end-to-end.

In aspects of the invention, the above-described multi-task trained models 436A can include sequence-based recurrent neural networks (RNNs) having intermediate hidden states. The intermediate hidden states in the auxiliary task sub-models 438A upstream from the QA sub-model 440A can be treated as encoded abstract representations (i.e., the abstract context 528) of the PDF document 412A, and the QA sub-model 440A is trained (or pre-trained) to use the encoded abstract representations as context to enable the QA sub-model 440A to generate the answer 450A to the user question 422A. Because the abstract representation (i.e., the abstract context 528) provided to the QA sub-model 440A is derived from the whole instance of PDF document 412A, the QA sub-model 440A now has access to information from all the different format types in the PDF document 412A, which enables the QA sub-model 440A to learn to relate information from different format types (e.g., text and table) when needed by the QA sub-model 440A to answer the user question 422A. The novel multi-model, multi-task trained training techniques and resulting neural network (e.g., the multi-task trained models 436A) ensures end-to-end differentiability, which means that the entire network architecture can differentiate at least the format-type and location of the relevant data in the PDF document 412A, which facilitates the global optimization of the neural network architecture through the joint and multi-task training techniques described herein.

Figure 6A:
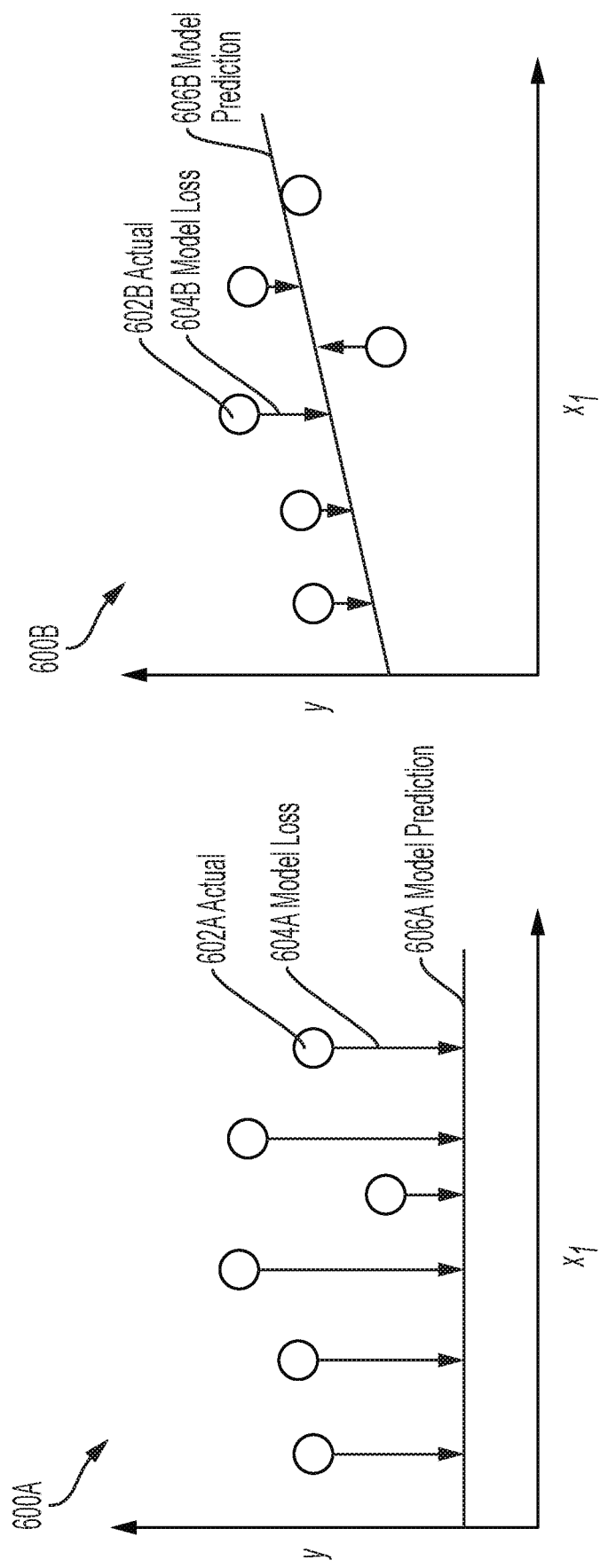
FIG. 6A depicts diagrams illustrating pre-training and post-training model loss in accordance with aspects of the invention.

FIG. 6A depicts diagrams illustrating a pre-training model plot 600A and a post-training model plot 600B, which illustrate a pre-training model loss 604A and a post-training model loss 604B in accordance with aspects of the invention. In general, the model losses 604A, 604B are the differences between the actual classification/predictions 602A, 602B and the model predictions 606A, 606B generated by the multi-task trained models 436A (shown in FIG. 5). Training the multi-task trained models 436A means learning/determining good/suitable values for all the weights and the biases from labeled training examples. In neural networks, each input is associated with a weight that increases the steepness of the activation function, while the bias is used to delay the triggering of the activation function. In the model plots 600A, 600B, the y-axis is the set of features that the multi-task trained models 436A use to make predictions, and the y-axis is the example's classification label. In supervised learning, the machine learning algorithm 434 (shown in FIG. 4A) build the multi-task trained models 436A by examining many examples and attempting to find a sub-model that minimizes the untrained model loss 604B. In general, the model losses 604A, 604B are the penalty for a bad prediction. In other words, the model losses 604A, 604B are each a number indicating how bad the sub-model's prediction was on a single example. If the sub-model's prediction is perfect, the model loss 604A, 604B is zero (0). Otherwise, the model loss 604A, 604B is greater than zero (0). The goal of training the multi-task trained models 436A is to find a set of weights and biases that have low loss, on average, across all examples.

The model loss 604A, 604B is calculated and propagated back through the network using a technique called back-propagation. The weights that determine the connection strengths between pairs of nodes in each relevant multi-task trained sub-model 436A is adjusted relative to how much it contributed to the model loss 604A, 604B. This process is repeated iteratively until the model loss 604A, 604B drops below an acceptable threshold.

A loss function is used to update weights/parameters. A loss function, or cost function, is a wrapper around the model prediction 606A, 606B of each the multi-task trained models 436A. The loss function is configured to convey "how well" each of the multi-task trained models 436A makes predictions for a given set of weights/parameters. The loss function has its own curve and its own derivatives. The slope of the loss function's curve provides guidance on how to change weights/parameters to make each of the multi-task trained models 436A more accurate. In general, each multi-task trained sub-model 436A is used to make model predictions 606A, 606B, and the loss function is used to update weights/parameters. The loss function can take a variety of forms, and many different loss functions are available. Suitable known loss functions for use in connection with aspects of the invention include root mean square error, cross entropy, sequence-to-sequence-loss, max-margin loss, and the like.

FIG. 6B depicts a diagram illustrating various stages of a multi-stage, multi-task training methodology 610 in accordance with embodiments of the invention. The training methodology 610 is a non-limiting example of a training method that can be used to train the multi-task trained models 436A shown in FIG. 5 in multiple stages, including generating the various model losses (l) (e.g., model losses 604A, 604B shown in FIG. 6A) contributed by each of the multi-task trained models 436A. The following description of the training methodology 610 will make reference to the STAGEs of the methodology 610 shown in FIG. 6B, as well as the corresponding element(s) of the multi-task training models 436A shown in FIG. 5. In accordance with aspects of the invention, at STAGE 1, the document layout sub-model 510 is pre-trained with PubLayNet to determine $l_{lay}$, which is the model loss associated with the document layout sub-model 510. PubLayNet is a large dataset of document images for which the layout is annotated with both bounding boxes and polygonal segmentations. At STAGE 2.1, the OCR sub-model 520 is pre-trained using, for example, pairs of text mages with text, thereby generating $l_{ocr}$, which is the model loss associated with the OCR sub-model 520. At STAGE 2.2 the table understanding sub-model 522 is pre-trained using, for example, pairs of table images with HTML data, thereby generating $l_{tab}$, which is the model loss associated with the table understanding sub-model 522. At STAGE 2.3, the figure understanding sub-model 524 is trained using, for example, pairs of figure images with text-based captions, thereby generating $l_{fig}$, which is the model loss associated with the figure understanding sub-model 524. At STAGE 2.4, the list understanding sub-model 526 is pre-trained using, for example, pairs of list images with HTML data, thereby generating $l_{lst}$, which is the model loss associated with the list understanding sub-model 526. At STAGE 3, the sub-models trained at STAGES 1, 2.1, 2.2, 2.3, and 2.4 are jointly trained with weighted sum of loss (i.e., $l_{lay} + \alpha l_{ocr} + \beta l_{tab} + \gamma l_{fig} + \delta l_{lst}$). At STAGE 4, the QA sub-model 440A and the sub-models trained at STAGE 3 are jointly trained with weighted sum of loss (i.e., $l_{lay} + \alpha l_{ocr} + \beta l_{tab} + \gamma l_{fig} + \delta l_{lst}) + \epsilon l_{qa}$.

Figure 7A:
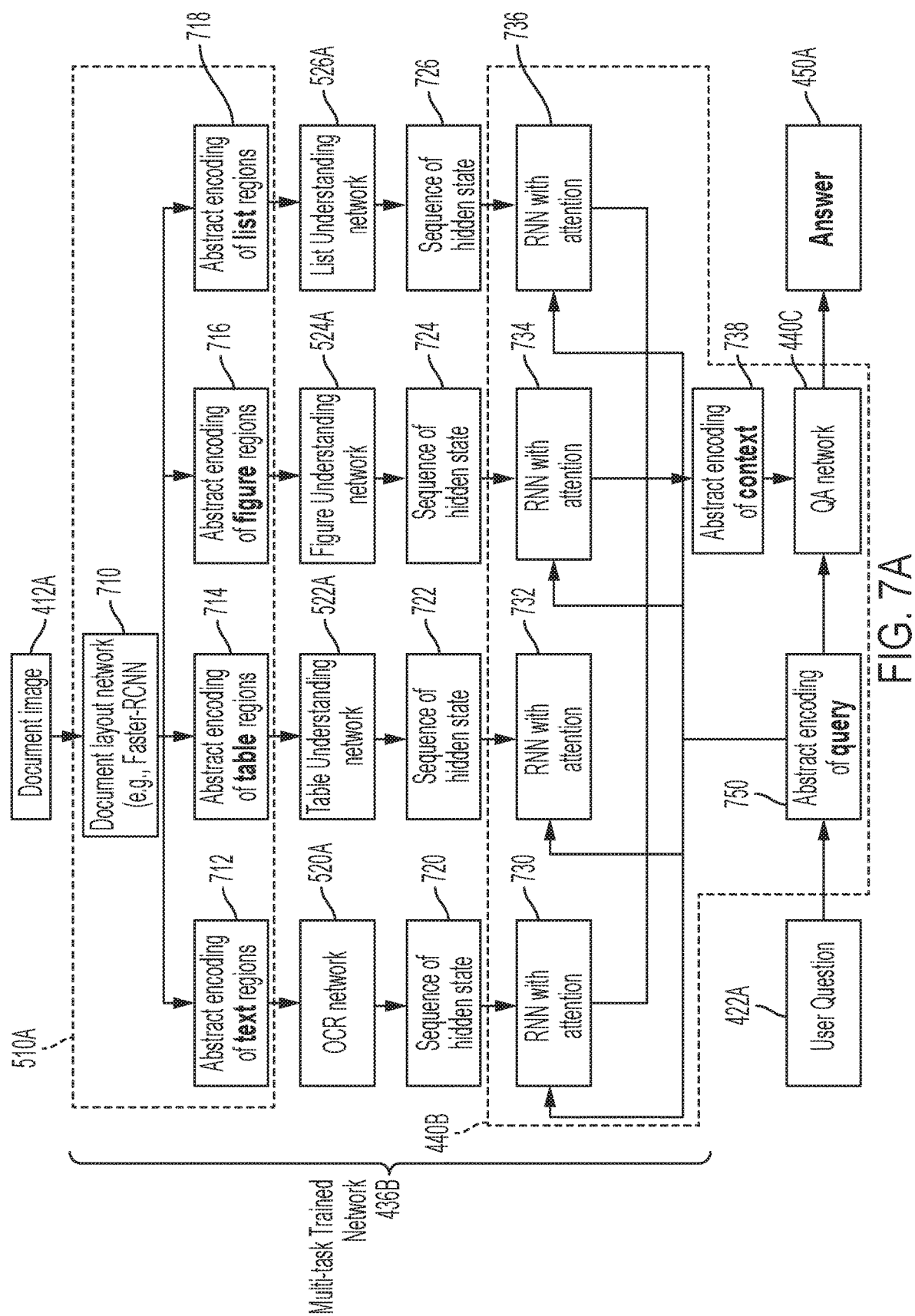
FIG. 7A depicts a block diagram illustrating an example network architecture of the multi-task trained sub-models shown in FIG. 5.

FIG. 7A depicts a block diagram illustrating an architecture of a multi-task trained network 436B in accordance with aspects of the invention. The multi-task trained network 436B corresponds to the multi-task trained models 436A (shown in FIG. 5) in that the multi-task trained network 436B includes network implementation details configured to perform substantially the same functionality described herein for the multi-task trained models 436A. The multi-task trained network 436B includes a layout understanding network 510A, an OCR network 520A, a table understanding network 522A, a figure understanding network 524A, a list understanding network 526A, and a modified QA network 440B, configured and arranged as shown.

The layout understanding network 510A includes a document layout network 710 configured to receive the document 412A, which is an image. The document layout 710 parses the document 412A into its various format types to output abstract encodings of text regions 712, abstract encodings of table regions 714, abstract encodings of figure regions 716, and abstract encodings of list regions 718. In accordance with aspects of the invention, the document layout network 710 can be implemented as an object detection network in accordance with aspects of the invention. The object detection operations performed by the document layout network 710 locate the presence of objects (e.g., format types) in the document image 412A with a bounding box and types or classes of the located objects in the document image 412A. The abstract encodings 712, 714, 716, 718 generated by the document layout network 710 include one or more bounding boxes (BBox) (e.g. defined by a point, width, and height), along with a class label for each bounding box. In embodiments of the invention, the document layout network 710 can be a region-based convolutional neural network (R-CNN). In embodiments of the invention, the R-CNN can be implemented as a so-called Faster R-CNN, which reduces its computational expense by sharing convolutions across proposals.

The OCR network 520A, the table understanding network 522A, the figure understanding network 524A, and the list understanding network 526A can each be implemented as encoder-decoder networks. The encoder portion of the network converts images of document components (e.g., the abstract encodings 712, 714, 716, 718) into abstract representations (e.g., high dimensional numerical vectors or weights), which are used by the decoder portion of the network to generate sequences of text and HTML tags. In embodiments of the invention, the decoder portion of the network can be implemented as a recurrent neural network (RNN) that uses loops to pass prior information forward to impact subsequent information. This prior information is referred to as the RNN's hidden states.

Figure 7B:
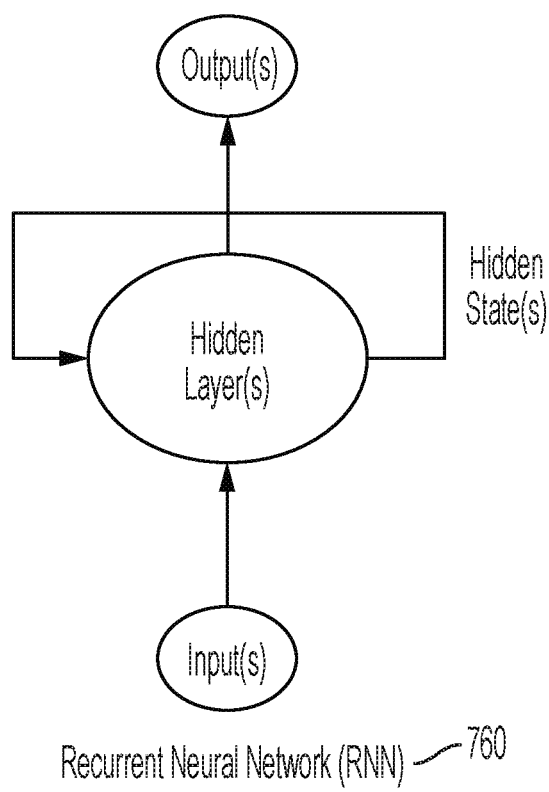
FIG. 7B depicts a simplified diagram illustrating hidden states in a recurrent neural network (RNN) capable of being used in connection with aspects of the invention.

FIG. 7B depicts an example RNN 760, which can be used as the decoder portions of the OCR network 520A (shown in FIG. 7A), the table understanding network 522A (shown in FIG. 7A), the figure understanding network 524A (shown in FIG. 7A), and the list understanding network 526A (shown in FIG. 7A). The RNN 760 is particularly suited for processing and making predictions about sequence data having a particular order in which one thing follows another. The RNN 760 includes a layer of input(s), hidden layer(s), and a layer of output(s). A feed-forward looping mechanism acts as a highway to allow hidden states of the RNN 760 to flow from one step to the next. As previously described herein, hidden states are a representation of previous inputs.

Returning back to FIG. 7A, the decoders in the OCR network 520A, the table understanding network 522A, the figure understanding network 524A, and the list understanding network 526A pass their sequences of hidden states 720, 722, 724, 726 to the modified QA network 440B. In embodiments of the invention, the modified QA network 440B can be implemented as encoder-decoder RNNs with attention 730, 732, 734, 736 communicatively coupled to a standard QA network 440C. A problem with encoder-decoder networks is that performance can degrade when the input and/or output sequences are relatively long. The reason is believed to be because of the fixed-sized internal representation used by the encoder. Attention is an extension applied to the encoder-decoder network that addresses this limitation. In some implementations, the attention technique can work by first providing a richer context from the encoder to the decoder, along with a learning mechanism where the decoder can learn where to pay attention in the richer encoding process when predicting each time step in the output sequence.

The RNNs with attention 730, 732, 734, 736 also receive an output from an abstract encoding of query 750, which is generated based on the user question 422A (also shown in FIG. 5). The RNNs with attention 730, 732, 734, 736 are concatenated to an abstract encoding of context 738 that is provided to the standard QA network 440C as context for generating the answer 450A (also shown in FIG. 5). The attention of the RNNs 730, 732, 734, 736 is computed based on the abstract encoding of the query 750. As the modified QA network 440B is trained, the attention portions of the RNNs 730, 732, 734, 736 learn to place higher attention on the content that is more relevant to the user questions 422A. The standard QA network 440C of the modified QA network 440B can be any question answering network that takes questions and context as inputs then outputs answers.

Figure 8:
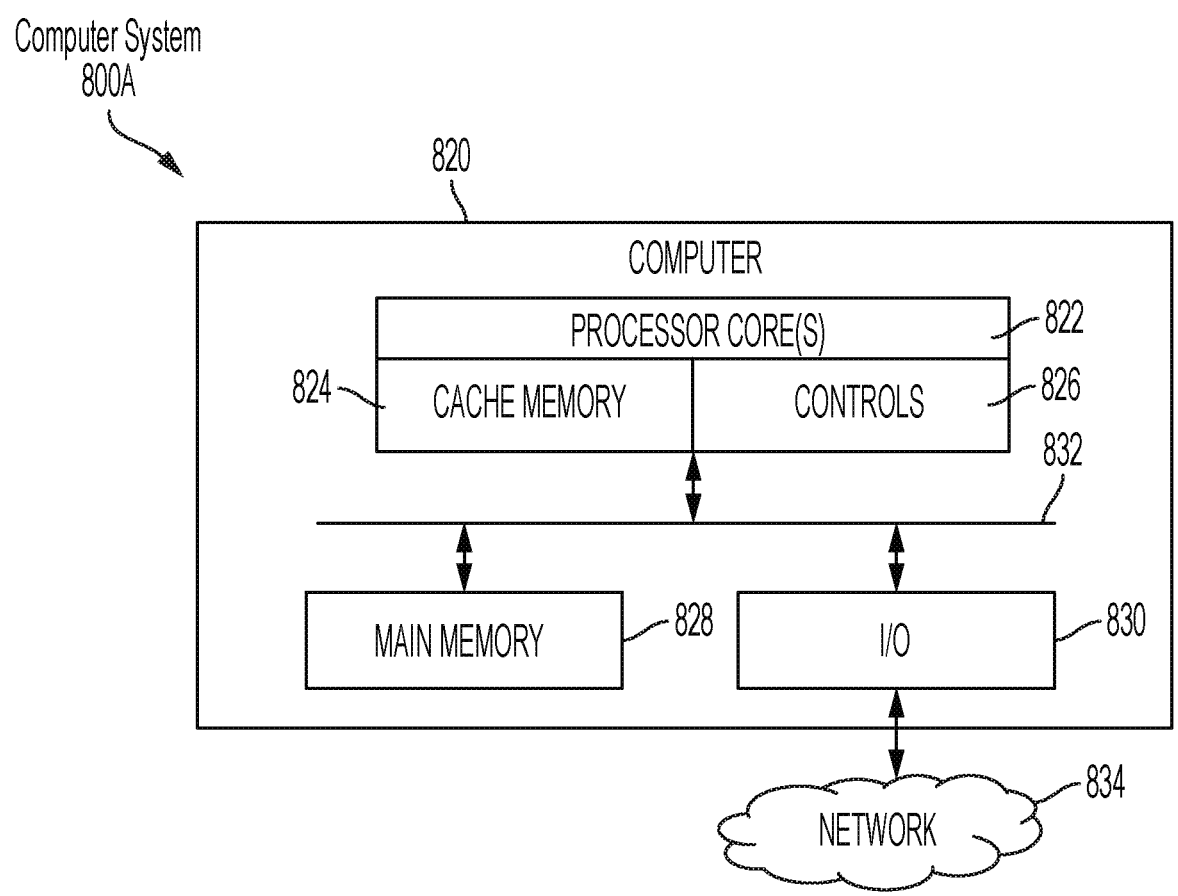
FIG. 8 depicts a computer system capable of implementing aspects of the invention.

FIG. 8 illustrates an example of a computer system 800A that can be used to implement the computer-based components of the neural network system 300 (shown in FIG. 3A) and the computer system 800 (shown in FIG. 4A) of the DCA system 400 (shown in FIG. 4A). The computer system 800A includes an exemplary computing device ("computer") 802 configured for performing various aspects of the content-based semantic monitoring operations described herein in accordance aspects of the invention. In addition to computer 802, exemplary computer system 800A includes network 814, which connects computer 802 to additional systems (not depicted) and can include one or more wide area networks (WANs) and/or local area networks (LANs) such as the Internet, intranet(s), and/or wireless communication network(s). Computer 802 and additional system are in communication via network 814, e.g., to communicate data between them.

Exemplary computer 802 includes processor cores 804, main memory ("memory") 810, and input/output component(s) 812, which are in communication via bus 803. Processor cores 804 includes cache memory ("cache") 806 and controls 808, which include branch prediction structures and associated search, hit, detect and update logic, which will be described in more detail below. Cache 806 can include multiple cache levels (not depicted) that are on or off-chip from processor 804. Memory 810 can include various data stored therein, e.g., instructions, software, routines, etc., which, e.g., can be transferred to/from cache 806 by controls 808 for execution by processor 804. Input/output component(s) 812 can include one or more components that facilitate local and/or remote input/output operations to/from computer 802, such as a display, keyboard, modem, network adapter, etc. (not depicted).

Technical effects and benefits of the novel multi-model, multi-task trained neural network includes that the auxiliary sub-models can be trained with less training data and computing resources than a brute force training method. Additionally, the multi-task and multi-stage training process used in aspects of the invention make the novel multi-model, multi-task trained neural network much easier to converge than traditional brute-force input-output training. Further, the novel multi-model, multi-task trained neural network is able to identify the location and format-type of the instance of unstructured electronic information that was determined by the DCA model to be relevant to the overall DCA task. For example, where the DCA model is a QA model, and where the instance of unstructured electronic information is a PDF document, the QA model can identify that relevant information used by the QA model to answer the presented inquiry is found in a specific figure. The portion of the PDF document that the QA model determined to be relevant to the QA model's task can be incorporated into an error analysis methodology. In embodiments of the invention, the error analysis methodology can include a process wherein, when a wrong answer or no answer is found, the error analysis methodology is triggered to use the location and format-type determined by the QA system to be relevant, as well as (optionally) the correct location and format-type, to check how the novel multi-model, multi-task trained neural network is performing in order to identify the problem and enable corrective fixes to be deployed to provide more accurate answers.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of performing a global task comprising analyzing an electronic version of a document, the computer-implemented method comprising:
    receiving, using a processor, an electronic document comprising electronic document data having multiple electronic format types;
    performing a first sub-task of the global task using a first machine learning model comprising a sequence-based neural network having intermediate hidden states, the first sub-task comprising:
        electronically recognizing multiple electronic format types in the electronic documents data based at least in part on a determination that one or more of the multiple electronic format types requires a unique set of analysis operations in order to be electronically read and electronically understood by a corresponding machine learning model, thereby generating multiple identified electronic format types;
        electronically parsing the electronic document data into the multiple identified electronic format types, thereby generating multiple parsed electronic format types;
        generating labels comprising numerical data identifying each of the multiple parsed electronic format types, wherein the numerical data of the labels is operable to be read and understood by a computer; and
        configuring the intermediate hidden states to comprise encoded representations of the multiple electronic format types by using the labels to perform individual labeling of each of the multiple parsed electronic format types, thereby configuring the intermediate hidden states to comprise multiple parsed labeled electronic format types;
    wherein the multiple parsed labeled electronic format types include a first parsed labeled electronic format type and a second parsed labeled electronic format type;

using a first format-type machine learning model to perform a second sub-task of the global task, the second sub-task comprising extracting features from the first parsed labeled electronic format type, thereby generating a first set of extracted features; and using a second format-type machine learning model to perform a third sub-task of the global task, the third sub-task comprising extracting features from the second parsed labeled electronic format type, thereby generating a second set of extracted features.

2. The computer-implemented method of claim 1, wherein the electronic document received using the processor is unlabeled.

3. The computer-implemented method of claim 1, wherein the electronic document data comprises electronic image data.

4. The computer-implemented method of claim 3, wherein:
the first electronic format type is selected from a group consisting of a segment of text, a table, a figure, and a list; and
the second electronic format type is selected from the group consisting of a segment of text, a table, a figure, and a list.

5. The computer-implemented method of claim 1 further comprising:
using a content analysis (CA) machine learning model to perform a fourth sub-task of the global task, the fourth sub-task comprising:
receiving an inquiry;
analyzing the first set of extracted features to determine a relevance of the first parsed labeled electronic format type to the inquiry; and
analyzing the second set of extracted features to determine a relevance of the second parsed labeled electronic format type to the inquiry;
wherein the first machine learning model, the first format-type machine learning model, the second format-type machine learning model, and the CA machine learning model have been trained in stages comprising:
a set of individual training stages comprising training:
the first machine learning model individually to perform the first sub-task;
the first format-type machine learning model individually to perform the second sub-task;
the second format-type machine learning model individually to perform the third sub-task; and
the CA machine learning model individually to perform the fourth sub-task;
a first joint training stage comprising jointly training:
the first machine learning model to perform the first sub-task;
the first format-type machine learning model to perform the second sub-task; and
the second format-type machine learning model to perform the third sub-task;
a second joint training stage comprising jointly training:
the first machine learning model to perform the first sub-task;
the first format-type machine learning model to perform the second sub-task;
the second format-type machine learning model to perform the third sub-task; and
the CA machine learning model to perform the fourth sub-task.

6. The computer-implemented method of claim 5, wherein the fourth sub-task performed by the CA machine learning model further comprises generating a response to the inquiry.

7. The computer-implemented method of claim 6, wherein generating the response to the inquiry is based at least in part on:
the relevance of the first parsed labeled electronic format type to the inquiry; and
the relevance of the second parsed labeled electronic format type to the inquiry.

8. A computer system for performing a global task, the global task comprising analyzing an electronic version of a document, the computer system comprising:
a memory; and
a processor communicatively coupled to the memory, wherein the processor is configured to perform operations comprising:
receiving an electronic document comprising electronic document data having multiple electronic format types;
performing a first sub-task of the global task using a first machine learning model comprising a sequence-based neural network having intermediate hidden states, the first sub-task comprising:
electronically recognizing multiple electronic format types in the electronic documents data based at least in part on a determination that one or more of the multiple electronic format types requires a unique set of analysis operations in order to be electronically read and electronically understood by a corresponding machine learning model, thereby generating multiple identified electronic format types;
electronically parsing the electronic document data into the multiple identified electronic format types, thereby generating multiple parsed electronic format types;
generating labels comprising numerical data identifying each of the multiple parsed electronic format types, wherein the numerical data of the labels is operable to be read and understood by a computer; and
configuring the intermediate hidden states to comprise encoded representations of the multiple electronic format types by using the labels to perform individual labeling of each of the multiple parsed electronic format types, thereby configuring the intermediate hidden states to comprise multiple parsed labeled electronic format types;
wherein the multiple parsed labeled electronic format types include a first parsed labeled electronic format type and a second parsed labeled electronic format type;
using a first format-type machine learning model to perform a second sub-task of the global task, the second sub-task comprising extracting features from the first parsed labeled electronic format type, thereby generating a first set of extracted features; and
using a second format-type machine learning model to perform a third sub-task of the global task, the third sub-task comprising extracting features from the second parsed labeled electronic format type, thereby generating a second set of extracted features.

9. The computer system of claim 8, wherein the electronic document received by the processor is unlabeled.

10. The computer system of claim 8, wherein the electronic document data comprises electronic image data.

11. The computer system of claim 10, wherein the first electronic format type is selected from a group consisting of a segment of text, a table, a figure, and a list.

12. The computer system of claim 11, wherein the second electronic format type is selected from the group consisting of a segment of text, a table, a figure, and a list.

13. The computer system of claim 8 further comprising:
using a content analysis (CA) machine learning model to perform a fourth sub-task of the global task, the fourth sub-task comprising:
receiving an inquiry;
analyzing the first set of extracted features to determine a relevance of the first parsed labeled electronic format type to the inquiry; and
analyzing the second set of extracted feature to determine a relevance of the second parsed labeled electronic format type to the inquiry;
wherein the first machine learning model, the first format-type machine learning model, the second format-type machine learning model, and the CA machine learning model have been trained in stages comprising:
a set of individual training stages comprising training:
the first machine learning model individually to perform the first sub-task;
the first format-type machine learning model individually to perform the second sub-task;
the second format-type machine learning model individually to perform the third sub-task; and
the CA machine learning model individually to perform the fourth sub-task;
a first joint training stage comprising jointly training:
the first machine learning model to perform the first sub-task;
the first format-type machine learning model to perform the second sub-task; and
the second format-type machine learning model to perform the third sub-task;
a second joint training stage comprising jointly training:
the first machine learning model to perform the first sub-task;
the first format-type machine learning model to perform the second sub-task;
the second format-type machine learning model to perform the third sub-task; and
the CA machine learning model to perform the fourth sub-task.

14. The computer system of claim 13, wherein:
the fourth sub-task performed by the CA machine learning model further comprises generating a response to the inquiry; and
generating the response to the inquiry is based at least in part on:
the relevance of the first parsed labeled electronic format type to the inquiry; and
the relevance of the second parsed labeled electronic format type to the inquiry.

15. A computer program product for performing a global task, the global task comprising analyzing an electronic version of a document, the computer program product comprising a computer readable storage medium having program instructions embodied therewith, the program instructions executable by a processor system to cause the processor system to perform operations comprising:

receiving an electronic document comprising electronic document data having multiple electronic format types;
performing a first sub-task of the global task using a first machine learning model comprising a sequence-based neural network having intermediate hidden states, the first sub-task comprising:
electronically recognizing multiple electronic format types in the electronic documents data based at least in part on a determination that one or more of the multiple electronic format types requires a unique set of analysis operations in order to be electronically read and electronically understood by a corresponding machine learning model, thereby generating multiple identified electronic format types;
electronically parsing the electronic document data into the multiple identified electronic format types, thereby generating multiple parsed electronic format types;
generating labels comprising numerical data identifying each of the multiple parsed electronic format types, wherein the numerical data of the labels is operable to be read and understood by a computer; and
configuring the intermediate hidden states to comprise encoded representations of the multiple electronic format types by using the labels to perform individual labeling of each of the multiple parsed electronic format types, thereby configuring the intermediate hidden states to comprise multiple parsed labeled electronic format types;
wherein the multiple parsed labeled electronic format types include a first parsed labeled electronic format type and a second parsed labeled electronic format type;
using a first format-type machine learning model to perform a second sub-task of the global task, the second sub-task comprising extracting features from the first parsed labeled electronic format type, thereby generating a first set of extracted features;
using a second format-type machine learning model to perform a third sub-task of the global task, the third sub-task comprising extracting features from the second parsed labeled electronic format type, thereby generating a second set of extracted features.

16. The computer program product of claim 15, wherein the electronic document received using the processor system is unlabeled.

17. The computer program product of claim 15, wherein the electronic document data comprises electronic image data.

18. The computer program product of claim 17, wherein:
the first electronic format type is selected from a group consisting of a segment of text, a table, a figure, and a list; and
the second electronic format type is selected from the group consisting of a segment of text, a table, a figure, and a list.

19. The computer program product of claim 15 wherein the operations further comprise:
using a content analysis (CA) machine learning model to perform a fourth sub-task of the global task, the fourth sub-task comprising:
receiving an inquiry;
analyzing the first set of extracted features to determine a relevance of the first parsed labeled electronic format type to the inquiry; and analyzing the second set of extracted features to determine a relevance of the second parsed labeled electronic format type to the inquiry;
wherein the first machine learning model, the first format-type machine learning model, the second format-type machine learning model, and the CA machine learning model have been trained in stages comprising:
a set of individual training stages comprising training:
the first machine learning model individually to perform the first sub-task;
the first format-type machine learning model individually to perform the second sub-task;
the second format-type machine learning model individually to perform the third sub-task; and
the CA machine learning model individually to perform the fourth sub-task;
a first joint training stage comprising jointly training:
the first machine learning model to perform the first sub-task;
the first format-type machine learning model to perform the second sub-task; and
the second format-type machine learning model to perform the third sub-task;
a second joint training stage comprising jointly training:
the first machine learning model to perform the first sub-task;
the first format-type machine learning model to perform the second sub-task;
the second format-type machine learning model to perform the third sub-task; and
the CA machine learning model to perform the fourth sub-task.

20. The computer program product of claim 19, wherein the fourth sub-task performed by the CA machine learning model further comprises generating a response to the inquiry.

21. The computer program product of claim 20, wherein generating the response to the inquiry is based at least in part on:
the relevance of the first parsed labeled electronic format type to the inquiry; and
the relevance of the second parsed labeled electronic format type to the inquiry.

22. A method of forming a computer system configured to perform a global task, the global task comprising analyzing an electronic version of a document, the method comprising:
obtaining a memory; and
communicatively coupling a processor to the memory, wherein the processor is configured to perform operations comprising:
receiving an electronic document comprising electronic document data having multiple electronic format types;
performing a first sub-task of the global task using a first machine learning model comprising a sequence-based neural network having intermediate hidden states, the first sub-task having a first assigned complexity level and comprising:
electronically recognizing multiple electronic format types in the electronic documents data based at least in part on a determination that one or more of the multiple electronic format types requires a unique set of analysis operations in order to be electronically read and electronically understood by a corresponding machine learning model, thereby generating multiple identified electronic format types;
electronically parsing the electronic document data into the multiple identified electronic format types, thereby generating multiple parsed electronic format types;
generating labels comprising numerical data identifying each of the multiple parsed electronic format types, wherein the numerical data of the labels is operable to be read and understood by a computer; and
configuring the intermediate hidden states to comprise encoded representations of the multiple electronic format types by using the labels to perform individual labeling of each of the multiple parsed electronic format types, thereby configuring the intermediates states to comprise multiple parsed labeled electronic format types;
wherein the multiple parsed labeled electronic format types include a first parsed labeled electronic format type and a second parsed labeled electronic format type;
using a first format-type machine learning model to perform a second sub-task of the global task, the second sub-task having a second assigned complexity level and comprising extracting features from the first parsed labeled electronic format type, thereby generating a first set of extracted features;
using a second format-type machine learning model to perform a third sub-task of the global task, the third sub-task having a third assigned complexity level and comprising extracting features from the second parsed labeled electronic format type, thereby generating a second set of extracted features; and
using a content analysis (CA) machine learning model to perform a fourth sub-task of the global task, the fourth sub-task having a fourth complexity level and comprising:
receiving an inquiry;
analyzing the first set of extracted features to determine a relevance of the first parsed labeled electronic format type to the inquiry; and
analyzing the second set of extracted features to determine a relevance of the second parsed labeled electronic format type to the inquiry;
wherein the fourth complexity level is greater than:
the third complexity level alone;
the second complexity level alone; and
the first complexity level alone.

23. A method of claim 22, wherein:
the electronic document received by the processor is unlabeled;
the electronic document data comprises electronic image data;
the first electronic format type is selected from a group consisting of a segment of text, a table, a figure, and a list;
the second electronic format type is selected from the group consisting of a segment of text, a table, a figure, and a list;
the fourth sub-task performed by the CA machine learning model further comprises generating a response to the inquiry based at least in part on:
the relevance of the first parsed labeled electronic format type to the inquiry; and the relevance of the second parsed labeled electronic format type to the inquiry the analysis.

* * * * *